US 11,544,136 B1

United States Patent
Pekel et al.

(10) Patent No.: US 11,544,136 B1
(45) Date of Patent: Jan. 3, 2023

(54) HYPER-PARAMETER SPACE OPTIMIZATION FOR MACHINE LEARNING DATA PROCESSING PIPELINE

(71) Applicant: SAP SE, Walldorf (DE)

(72) Inventors: Isil Pekel, Mannheim (DE); Steven Jaeger, Heidelberg (DE); Manuel Zeise, Karlsruhe (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/395,094

(22) Filed: Aug. 5, 2021

(51) Int. Cl.
| | |
|---|---|
| *G06F 11/07* | (2006.01) |
| *G06N 20/00* | (2019.01) |
| *G06F 11/36* | (2006.01) |
| *G06N 20/20* | (2019.01) |

(52) U.S. Cl.
CPC .......... *G06F 11/079* (2013.01); *G06F 11/366* (2013.01); *G06N 20/00* (2019.01); *G06N 20/20* (2019.01)

(58) Field of Classification Search
CPC ..... G06F 11/079; G06F 11/366; G06N 20/20; G06N 20/00
See application file for complete search history.

(56) References Cited

U.S. PATENT DOCUMENTS

| | | | |
|---|---|---|---|
| 2019/0253328 A1* | 8/2019 | Kolar | H04L 43/0823 |
| 2019/0356553 A1* | 11/2019 | Mermoud | G06K 9/6282 |
| 2019/0370610 A1* | 12/2019 | Batoukov | G06F 11/0709 |
| 2020/0382361 A1* | 12/2020 | Chandrasekhar | H04L 41/064 |
| 2021/0028973 A1* | 1/2021 | Côté | G06N 3/0472 |
| 2021/0035026 A1* | 2/2021 | Bansal | H04L 41/064 |
| 2021/0136098 A1* | 5/2021 | Stergioudis | G06N 20/20 |
| 2021/0158183 A1* | 5/2021 | Lohia | G06N 20/20 |
| 2022/0012591 A1* | 1/2022 | Dalli | G06F 17/18 |
| 2022/0014424 A1* | 1/2022 | Yadav | H04W 24/02 |
| 2022/0038332 A1* | 2/2022 | Umakanth | H04L 41/5016 |

* cited by examiner

*Primary Examiner* — Jonathan D Gibson
(74) *Attorney, Agent, or Firm* — Mintz Levin Cohn Ferris Glovsky and Popeo, P.C.

(57) ABSTRACT

A data processing pipeline may be generated to include an orchestrator node, a preparator node, and an executor node. The preparator node may generate a training dataset. The executor node may execute machine learning trials by applying, to the training dataset, a machine learning model and/or a different set of trial parameters. The orchestrator node may identify, based on a result of the machine learning trials, a machine learning model for performing a task. Data associated with the execution of the data processing pipeline may be collected for storage in a tracking database. A report including de-normalized and enriched data from the tracking database may be generated. The hyper-parameter space of the machine learning model may be analyzed based on the report. A root cause of at least one fault associated with the execution of the data processing pipeline may be identified based on the analysis.

20 Claims, 21 Drawing Sheets

FIG. 3C

Summary | Cockpit | Leaderboard

Datasets
Select Training Dataset: payment_risk_training
Select Test Dataset: payment_risk_test
Target Metric: Log Loss
Target Column: payment
Task: Classification

Budget
Time: 30 minutes
Workers: 5

Performance Progression

(scatter plot: Metric vs Execution Time, 0–35)

Models
- Passive Aggressive Classifier Pipeline
  Current Score: 23.9485
  Runtime: 3.03 minutes
- LightGBM Classifier Pipeline
  Current Score: 25.5177
  Runtime: 3.33 minutes
- XGBoost Classifier Pipeline
  Current Score: 19.6623
  Runtime: 3.43 minutes
- TensorFlow Classifier Pipeline
  Current Score: 20.3737
  Runtime: 10.55 minutes

Leaderboard

| Trial Name | Description | Type | Log Loss | Training Duration |
|---|---|---|---|---|
| Random Forest Classifier Pipeline | Removal of columns with zero variance - Category counting - Date encoding - Integer enco... Show More | Single | 0.1816 | 5.33 minutes |
| XGBoost Classifier Pipeline | Removal of columns with zero variance - Category counting - Date encoding - Integer enco... Show More | Single | 0.2581 | 10.12 minutes |
| LightGBM Classifier Pipeline | Removal of columns with zero variance - Category counting - Date encoding - Integer enco... Show More | Single | 0.8264 | 4.53 minutes |
| Ensemble Classifier Pipeline | Removal of columns with zero variance - Category counting - Date encoding - Integer enco... Show More | Ensemble | 0.9381 | 10.52 minutes |
| TensorFlow Classifier Pipeline | Removal of columns with zero variance - Category counting - Date encoding - Integer enco... Show More | Single | 1.1277 | 3.32 minutes |
| Passive Aggressive Classifier Pipeline | Removal of columns with zero variance - Category counting - Date encoding - Integer enco... Show More | Single | 1.6192 | 4.56 minutes |
| Random Forest Classifier Pipeline | Removal of columns with zero variance - Category counting - Date encoding - Integer enco... Show More | Single | 1.8009 | 3.32 minutes |
| LightGBM Classifier Pipeline | Removal of columns with zero variance - Category counting - Date encoding - Integer enco... Show More | Single | 1.807 | 6.55 minutes |
| TensorFlow Classifier Pipeline | Removal of columns with zero variance - Category counting - Date encoding - Integer enco... Show More | Single | 1.8357 | 3.43 minutes |
| Random Forest Classifier Pipeline | Removal of columns with zero variance - Category counting - Date encoding - Integer enco... Show More | Single | 1.8868 | 9.03 minutes |
| Passive Aggressive Classifier Pipeline | Removal of columns with zero variance - Category counting - Date encoding - Integer enco... Show More | Single | 1.9967 | 4.56 minutes |

| Number of rows | Task type | Number of categoric features | Number of numeric features | ... | switch_imputation | switch_classification | classification:catboost_max_depth | classification:catboost_n_estimators | ... | Target |
|---|---|---|---|---|---|---|---|---|---|---|
| 50000 | Binary classification | 2 | 4 | ... | Mean | Catboost | 10 | 100 | ... | 0.56 |
| 50000 | Binary classification | 2 | 4 | ... | Median | Catboost | 5 | 100 | ... | 0.80 |
| ... | ... | ... | ... | ... | ... | ... | ... | ... | ... | ... |
| 24000 | Regression | 0 | 3 | ... | Mean | Catboost | 8 | 500 | ... | 25.4 |
| 370000 | Regression | 0 | 9 | ... | Mean | MLP | - | - | ... | 12.1 |
| ... | ... | ... | ... | ... | ... | ... | ... | ... | ... | ... |

HYPER-PARAMETER SPACE OPTIMIZATION FOR MACHINE LEARNING DATA PROCESSING PIPELINE

TECHNICAL FIELD

The subject matter described herein relates generally to machine learning and more specifically to optimizing the hyper-parameter space of a data processing pipeline implementing a machine learning model.

BACKGROUND

Machine learning models may be trained to perform a variety of cognitive tasks including, for example, object identification, natural language processing, information retrieval, speech recognition, classification, regression, and/or the like. For example, an enterprise resource planning (ERP) system may include an issue tracking system configured to generate a ticket in response to an error reported via one or more telephone calls, emails, short messaging service (SMS) messages, social media posts, web chats, and/or the like. The issue tracking system may generate the ticket to include a textual description of the error associated with the ticket. As such, in order to determine a suitable response for addressing the error associated with the ticket, the enterprise resource planning system may include a machine learning model trained to perform text classification. For instance, the machine learning model may be trained to determine, based at least on the textual description of the error, a priority for the ticket corresponding to a severity of the error.

SUMMARY

Systems, methods, and articles of manufacture, including computer program products, are provided for optimizing a hyper-parameter space of a machine learning data processing pipeline. In one aspect, there is provided a system including at least one data processor and at least one memory. The at least one memory may store instructions that cause operations when executed by the at least one data processor. The operations may include: collecting, for storage in a tracking database, data associated with an execution of a data processing pipeline, the data processing pipeline being executed to generate a machine learning model having a set of hyper-parameters for performing a task associated with an input dataset, the execution of the data processing pipeline includes executing a plurality of machine learning trials, each of the plurality of machine learning trials applying, to a training dataset, a different type of machine learning model and/or a different set of trial parameters, and the machine learning model having the set of hyper-parameters for performing the task being identified based at least on a result of the plurality of machine learning trials; generating, based on at least a portion of the data associated with the execution of the data processing pipeline, a report; analyzing, based on at least a portion of the report, a hyper-parameter space of the machine learning model; and identifying, based at least on the analysis of the hyper-parameter space, a root cause of at least one fault associated with the execution of the data processing pipeline.

In some variations, one or more features disclosed herein including the following features can optionally be included in any feasible combination. A logical table may be generated by at least de-normalizing the data associated with the execution of the data processing pipeline. The report may be generated based on the logical table. Each row of logical table may correspond to one machine learning trial from the plurality of machine learning trials. Each column of the logical table may correspond to a value describing the plurality of machine learning trials, a corresponding experiment, and/or the result of the plurality of machine learning trials.

In some variations, the plurality of machine learning trials may be sorted based at least on a target metric. A column corresponding to a rank of each machine learning trials included in the sorted plurality of machine learning trials may be added to the logical table.

In some variations, a relative deviation from a target metric associated with a validation dataset and/or a test dataset may be determined for each machine learning trial of the plurality of machine learning trials. A column corresponding to the relative deviation may be added to the logical table.

In some variations, the report may be generated by applying an association rules algorithm to generate one or more association rules linking one or more hyper-parameters of the machine learning model to the result of the plurality of machine learning trials.

In some variations, an association rule supported by a below-threshold proportion of the data associated with the execution of the data processing pipeline may be excluded from the one or more association rules applied to generate the report.

In some variations, the report may be generated by applying an interpretability technique to calculate an effect of a hyper-parameter of the machine learning model on a target metric.

In some variations, the at least one fault may include one or more hyper-parameter values with an unexpected behavior, a combination of machine learning models with below-threshold performance, and/or poor scaling behavior.

In some variations, one or more corrective actions corresponding to the root cause of the at least one fault may be performed. The one or more corrective actions may include removing a hyper-parameter, quantizing a hyper-parameter having continuous values, and/or restricting and/or rescaling a range of a hyper-parameter.

In some variations, the data associated with the execution of the data processing pipeline may include one or more task metadata, target performance metrics, and hyper-parameter values.

In some variations, the data processing pipeline may include an orchestrator node, a preparator node, and a plurality of executor nodes. The preparator node may be configured to generate, based at least on the input dataset, the training dataset. The plurality of executor nodes may be configured to execute the plurality of machine learning trials by at least applying, to the training dataset, the different type of machine learning model and/or the different set of trial parameters. The orchestrator node may be configured to identify, based at least on the result of the plurality of machine learning trials, the machine learning model having the set of hyper-parameters for performing the task.

In some variations, the machine learning model may include a neural network, a regression model, an instance-based model, a regularization model, a decision tree, a random forest, a Bayesian model, a clustering model, an associative model, a dimensionality reduction model, and/or an ensemble model.

In another aspect, there is provided a method for optimizing a hyper-parameter space of a machine learning data processing pipeline. The method may include: collecting, for storage in a tracking database, data associated with an execution of a data processing pipeline, the data processing pipeline being executed to generate a machine learning model having a set of hyper-parameters for performing a task associated with an input dataset, the execution of the data processing pipeline includes executing a plurality of machine learning trials, each of the plurality of machine learning trials applying, to a training dataset, a different type of machine learning model and/or a different set of trial parameters, and the machine learning model having the set of hyper-parameters for performing the task being identified based at least on a result of the plurality of machine learning trials; generating, based on at least a portion of the data associated with the execution of the data processing pipeline, a report; analyzing, based on at least a portion of the report, a hyper-parameter space of the machine learning model; and identifying, based at least on the analysis of the hyper-parameter space, a root cause of at least one fault associated with the execution of the data processing pipeline.

In some variations, one or more features disclosed herein including the following features can optionally be included in any feasible combination. The method may further include: generating a logical table by at least de-normalizing the data associated with the execution of the data processing pipeline, the report being generated based on the logical table, each row of logical table corresponding to one machine learning trial from the plurality of machine learning trials, and each column of the logical table corresponding to a value describing the plurality of machine learning trials, a corresponding experiment, and/or the result of the plurality of machine learning trials.

In some variations, the method may further include: sorting, based at least on a target metric, the plurality of machine learning trials; and adding, to the logical table, a column corresponding to a rank of each machine learning trials included in the sorted plurality of machine learning trials.

In some variations, the method may further include: determining, for each machine learning trial of the plurality of machine learning trials, a relative deviation from a target metric associated with a validation dataset and/or a test dataset; and adding, to the logical table, a column corresponding to the relative deviation.

In some variations, the report may be generated by applying an association rules algorithm to generate one or more association rules linking one or more hyper-parameters of the machine learning model to the result of the plurality of machine learning trials. An association rule supported by a below-threshold proportion of the data associated with the execution of the data processing pipeline may be excluded from the one or more association rules applied to generate the report.

In some variations, the report may be generated by applying an interpretability technique to calculate an effect of a hyper-parameter of the machine learning model on a target metric.

In some variations, the method may further include: performing one or more corrective actions corresponding to the root cause of the at least one fault, the one or more corrective actions include removing a hyper-parameter, quantizing a hyper-parameter having continuous values, and/or restricting and/or rescaling a range of a hyper-parameter.

In another aspect, there is provided a computer program product that includes a non-transitory computer readable storage medium. The non-transitory computer-readable storage medium may include program code that causes operations when executed by at least one data processor. The operations may include: collecting, for storage in a tracking database, data associated with an execution of a data processing pipeline, the data processing pipeline being executed to generate a machine learning model having a set of hyper-parameters for performing a task associated with an input dataset, the execution of the data processing pipeline includes executing a plurality of machine learning trials, each of the plurality of machine learning trials applying, to a training dataset, a different type of machine learning model and/or a different set of trial parameters, and the machine learning model having the set of hyper-parameters for performing the task being identified based at least on a result of the plurality of machine learning trials; generating, based on at least a portion of the data associated with the execution of the data processing pipeline, a report; analyzing, based on at least a portion of the report, a hyper-parameter space of the machine learning model; and identifying, based at least on the analysis of the hyper-parameter space, a root cause of at least one fault associated with the execution of the data processing pipeline.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a machine learning data processing pipeline, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 3C depicts an example of a user interface, in accordance with some example embodiments;

FIG. 5A depicts an example of data used for generating a report, in accordance with some example embodiments;

FIG. 5B depicts an example of a hyper-parameter space report, in accordance with some example embodiments;

When practical, similar reference numbers denote similar structures, features, or elements.

DETAILED DESCRIPTION

Figure 1A:
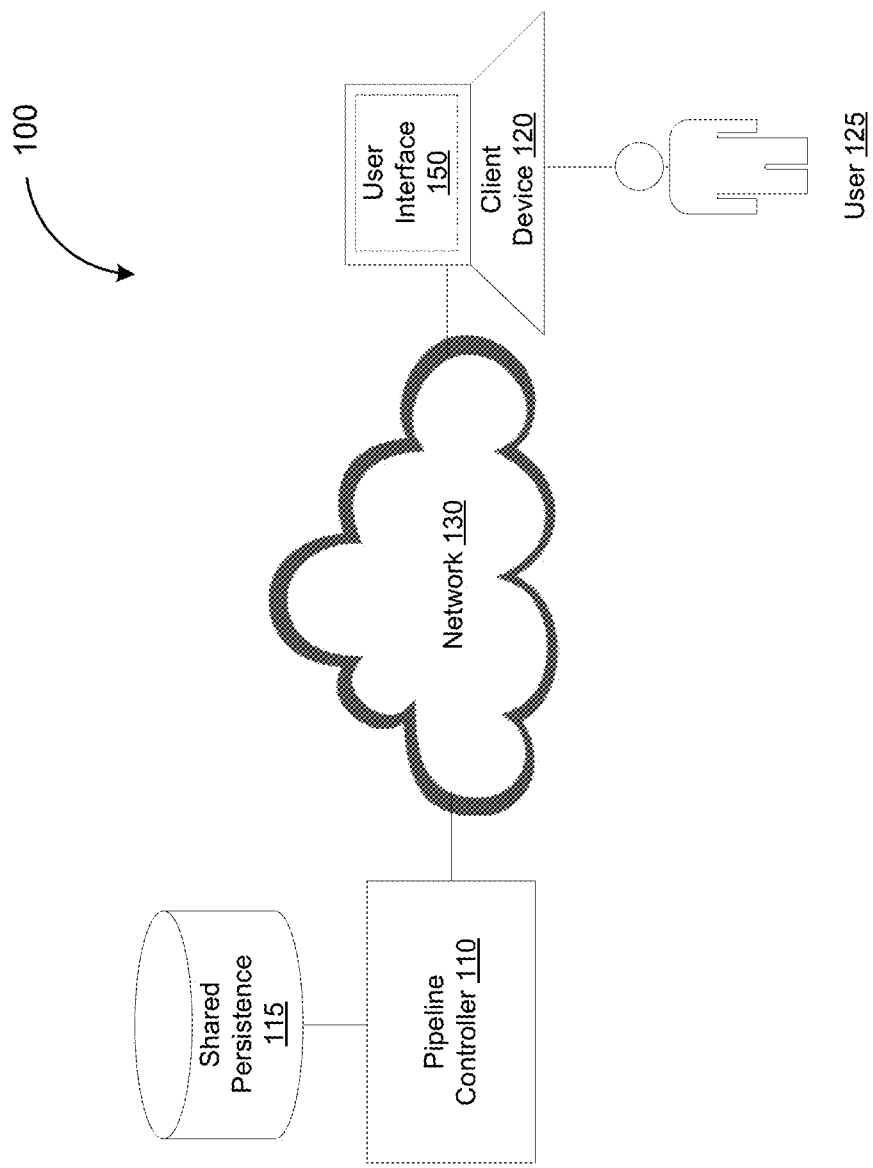
FIG. 1A depicts a system diagram illustrating a data processing pipeline generator system, in accordance with some example embodiments.

A data processing pipeline may include a series of operations for processing data including collecting and/or manipulating data, such as exceptionally voluminous and/or complex data sets known as "big data." The data processing pipeline may be represented graphically as a plurality of operator nodes interconnected by one or more directed edges of a directed graph. Each operator node may correspond to a data processing operation performed on data traversing through the operator node. Meanwhile, a directed edge interconnecting two operator nodes may indicate a flow of data between the data processing operations corresponding to each operator node. Accordingly, a graph, such as a directed graph, representative of the data processing pipeline may be constructed by at least interconnecting, with one or more directed edges, a series of operator nodes.

The graph representative of the data processing pipeline may be constructed to include one or more operator nodes configured to generate a machine learning model trained to perform a task. For example, the graph may be constructed to include an orchestrator node, one or more preparator nodes, and one or more executor nodes. The orchestrator node may be configured to coordinate the operations of preparator node and the one or more executor node. For instance, each preparator node may be configured to generate, based at least on an input dataset associated with the task, a training dataset and a validation dataset. Meanwhile, each executor node may be configured to apply, to the training dataset and the validation dataset generated by the preparator node, a different type of machine learning model and/or a different set of parameters. The orchestrator node may be configured to determine, based at least on the performance of the different type of machine learning models, a machine learning model including a set of model parameters and hyper-parameters for performing the task associated with the input dataset. Accordingly, the machine learning model trained to perform the task may be generated by at least executing the data processing pipeline including the orchestrator node, the one or more preparator nodes, and the one or more executor nodes.

In some example embodiments, one or more problems associated to the execution of the data processing pipeline may require the configurations of the data processing pipeline to undergo one or more optimizations. For example, the data processing pipeline may be optimized to avoid stalls during which the data processing pipeline fails to generate the results of a machine learning trial for an excessively large quantity of time. Alternatively and/or additionally, the data processing pipeline may be optimized to avoid excessive resource consumption including, for example, lengthy trial runtime, high peak memory consumption, large runtime artifacts, and/or the like. In some cases, optimizations may be necessary to improve the unexpectedly poor results associated with specific input datasets. Although rare, the data processing pipeline may sometimes require optimization to avoid failures in which the data processing pipeline fails to execute altogether.

The configurations of the data processing pipeline may include a set of hyper-parameters spanning a hyper-parameter space. Each hyper-parameter, which may be associated with different values, may control a certain aspect of the data processing pipeline. One example of a hyper-parameter may be the depth of the trees included in a random forest model. It should be appreciated that the types of algorithm that are used by the operator nodes included in the data processing pipeline may themselves be hyper-parameters. For instance, whether Z scaling or min/max scaling is used to normalize the input dataset may be one of the hyper-parameters associated with the data processing pipeline. Thus, optimizing the data processing pipeline may include determining the configuration of the data processing pipeline as a whole and the configuration of each operator node included in the data processing pipeline. This may be accomplished by identifying a set of hyper-parameters that yields the best result with respect to a defined target metric. However, the hyper-parameter space may include numerous hyper-parameters, with many being conditional hyper-parameters that are only active when present in certain combinations. Meanwhile, relatively few hyper-parameters may in fact be contributing to the problems encountered during the execution of the data processing pipeline. The task of identifying an optimal set of hyper-parameters may be challenging especially when the optimization requires identifying the hyper-parameters giving rise problems that are rare and/or difficult to reproduce.

In some example embodiments, hyper-parameter space optimization may be enabled by the collection of data associated with the execution of the data processing pipeline including, for example, runtime information, task metadata, trial configurations, experiment configurations, and/or the like. A structured report generated based on the data may be generated to enable an analysis of the hyper-parameter space to identify the root causes of the faults associated with the execution of the data processing pipeline such as stalls, excessive resource consumption, poor results, failures, and/or the like. The report may be generated based on a set schedule and/or in response to a trigger event including a user input requesting the generation of the report. Corrective actions to address these faults may be determined based on at least a portion of the contents of the report.

FIG. 1A depicts a system diagram illustrating a data processing pipeline generator system 100, in accordance with some example embodiments. Referring to FIG. 1A, the data processing pipeline generator system 100 may include a pipeline controller 110. As shown in FIG. 1A, the pipeline controller 110 and the client device 120 may be communicatively coupled via a network 130. The client device 120 may be a processor-based device including, for example, a smartphone, a tablet computer, a wearable apparatus, a virtual assistant, an Internet-of-Things (IoT) appliance, and/or the like. Meanwhile, the network 130 may be any wired and/or wireless network including, for example, a public land mobile network (PLMN), a wide area network (WAN), a local area network (LAN), a virtual local area network (VLAN), the Internet, and/or the like.

The client device 120 may interact with the pipeline controller 110 to generate one or more data processing pipelines. As shown in FIG. 1A, the pipeline controller 110 may be associated with a user interface 150 configured to receive, from a user 125 at the client device 120, one or more inputs for editing a graph representative of a data processing pipeline as well as output, to the user 125 at the client device 120, a progress and/or a result of executing the data processing pipeline. In some example embodiments, the one or more inputs may edit the graph representative of the data processing pipeline to include one or more operator nodes configured to generate, based at least on an input dataset, a machine learning model trained to perform a task associated with the input dataset. For example, the graph representative of the data processing pipeline may be edited to include an orchestrator node, one or more preparator node, and one or more executor nodes.

In some example embodiments, the orchestrator node may be configured to coordinate the operations of the one or more executor node. Meanwhile, each executor node may be configured to apply, to a training dataset and a validation dataset generated by the one or more preparator nodes based on the input dataset, a different type of machine learning model and/or a different set of parameters. Furthermore, the orchestrator node may be configured to identify, based at least on the performance associated with the different types of machine learning models and/or different sets of parameters, a machine learning model for performing the task associated with the input dataset. Accordingly, the machine learning model trained to perform the task may be generated by at least executing the data processing pipeline including the orchestrator node, the one or more preparator nodes, and the one or more executor nodes. For example, the data processing pipeline may be executed to generate a machine learning model trained to perform a cognitive task such as object identification, natural language processing, information retrieval, speech recognition, classification, and/or regression. The machine learning model may be any type of machine learning model including, for example, a neural network, a regression model, an instance-based model, a regularization model, a decision tree, a random forest, a Bayesian model, a clustering model, an associative model, a dimensionality reduction model, an ensemble model, and/or the like.

Figure 2A:
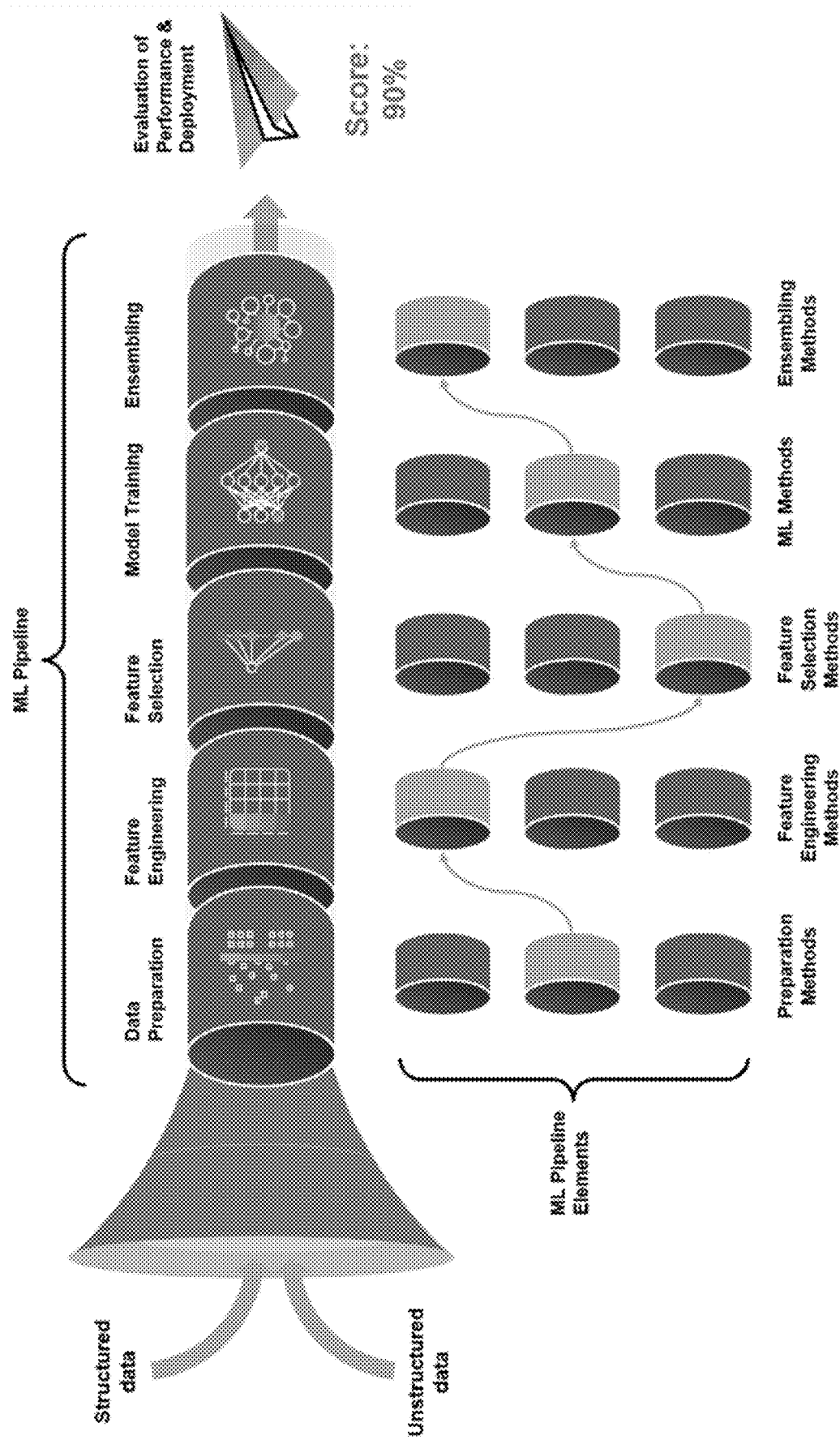
FIG. 2A depicts a schematic diagram illustrating an example of a data processing pipeline having modular pipeline elements, in accordance with some example embodiments.

To further illustrate, FIG. 2A depicts a schematic diagram illustrating an example of a data processing pipeline having modular pipeline elements, in accordance with some example embodiments. As shown in FIG. 2A, the data processing pipeline may include different combination of the elements for data preparation, feature engineering, feature selection, model training, ensembling, and/or the like. Each element of the data processing pipeline may be associated with one or more hyper-parameters. A machine learning model for performing the task associated with the input dataset may be identified by at least evaluating a performance of the data processing pipeline across different combinations of pipeline elements and hyper-parameters. For example, an executor node may be configured to execute one or more machine learning trials, each of which corresponding to a different combination of pipeline elements and hyper-parameters. Moreover, the orchestrator node may identify, based at least on the performance of the one or more machine learning trials, the machine learning model for performing the task associated with the input dataset. As used herein, the "optimal" machine learning model for performing the task may refer to a combination of a type of machine learning model and the corresponding parameters and hyper-parameters that yielded the best performance across the one or more machine learning trials.

Figure 2B:
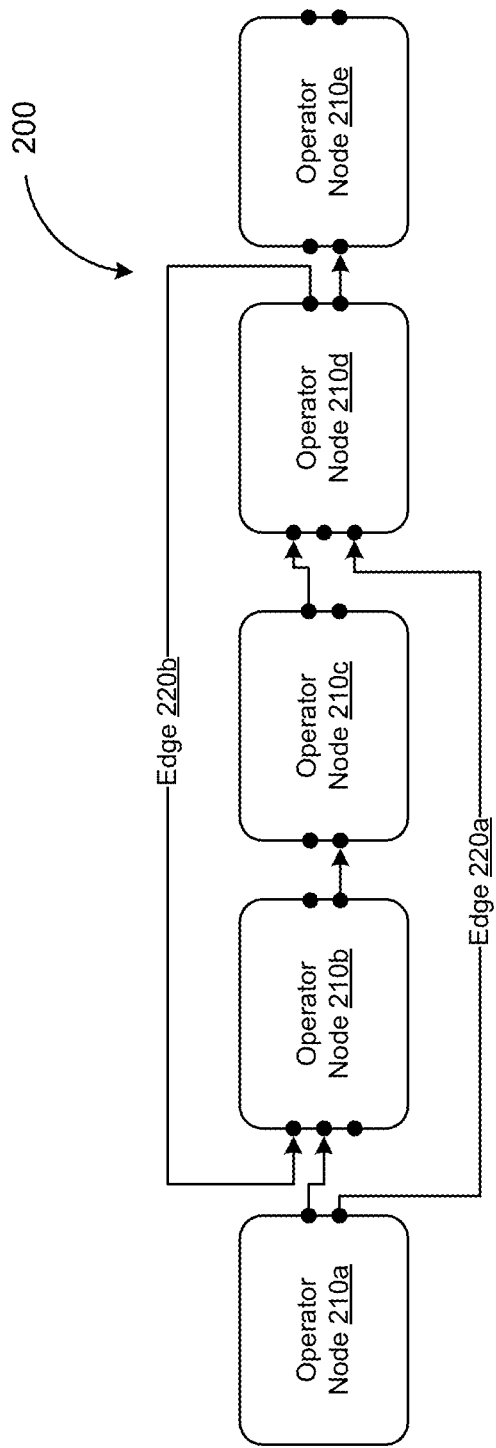
FIG. 2B depicts an example of a graph representative of a data processing pipeline, in accordance with some example embodiments.

FIG. 2B depicts an example of a graph representative of a data processing pipeline 200, in accordance with some example embodiments. Referring to FIG. 2B, the data processing pipeline 200 may include a plurality of operator nodes including, for example, a first operator node 210a, a second operator node 210b, a third operator node 210c, a fourth operator node 210d, a fifth operator node 210e, and/or the like. Each of the first operator node 210a, the second operator node 210b, the third operator node 210c, the fourth operator node 210d, and/or the fifth operator node 210e may correspond to a data processing operation performed on data traversing through the operator node.

Furthermore, FIG. 2B shows the first operator node 210a, the second operator node 210b, the third operator node 210c, the fourth operator node 210d, and/or the fifth operator node 210e as interconnected via one or more directed edges. A directed edge may indicate a flow of data between the data processing operations corresponding to operator nodes interconnected by the directed edge. For example, a first edge 220a may interconnect the first operator node 210a and the fourth operator node 210d to at least indicate that an output of the data processing operation corresponding to the first operator node 210a is provided as an input to the data processing operation corresponding to the fourth operator node 210d. Alternatively and/or additionally, a second edge 220b interconnected the second operator node 210b and the fourth operator node 210d may indicate that an output of the data processing operation corresponding to the fourth operator node 210d may be provided as an input to the data processing operation corresponding to the second operator node 210b.

Figure 2C:
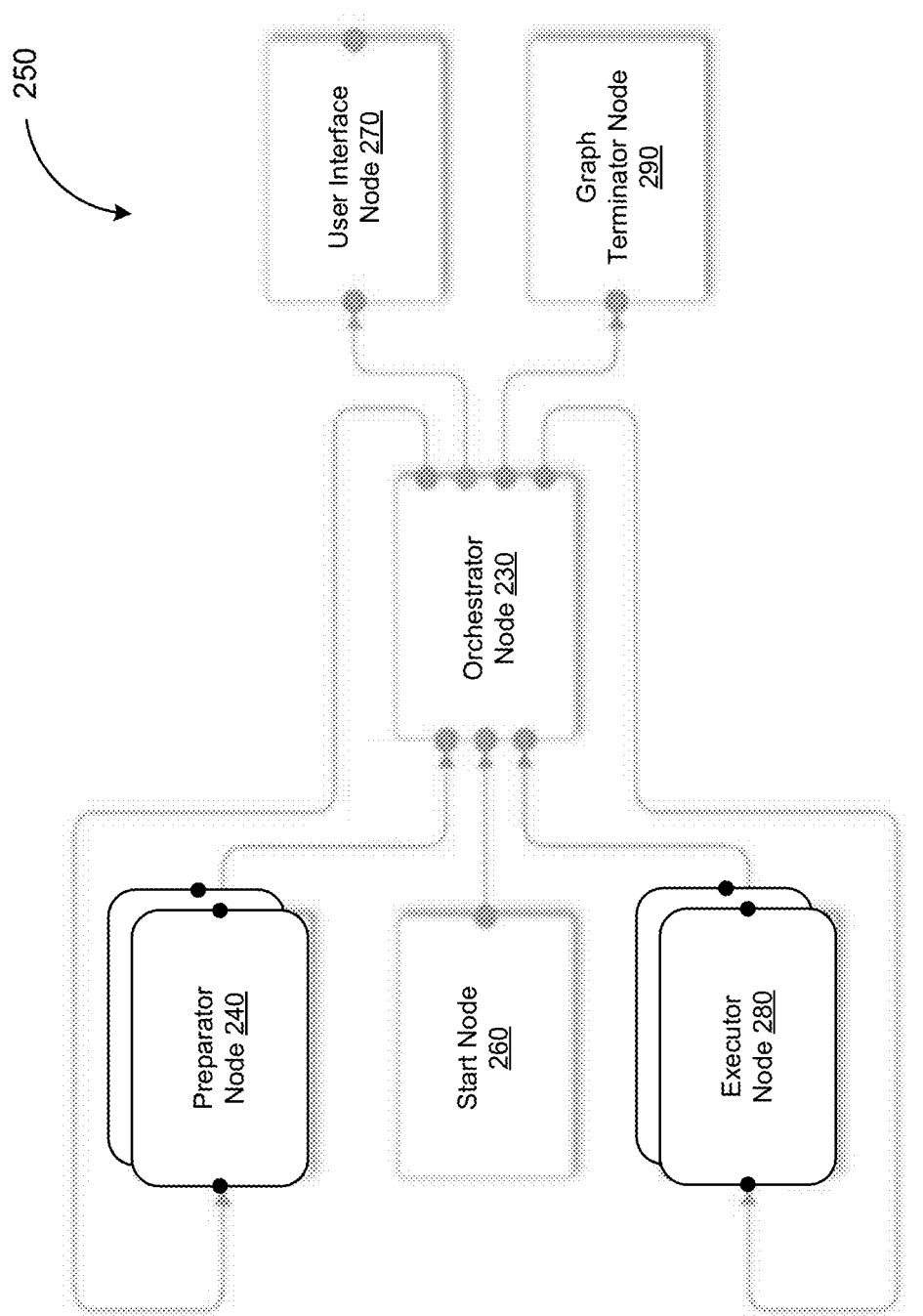
FIG. 2C depicts examples of operator nodes forming a data processing pipeline configured to generate a machine learning model, in accordance with some example embodiments.

In some example embodiments, a data processing pipeline may be constructed to include one or more specific operator nodes in order to implement a machine learning model trained to perform a cognitive task such as, for example, object identification, natural language processing, information retrieval, speech recognition, classification, and/or regression. FIG. 2C depicts examples of operator nodes forming a data processing pipeline 250 configured to generate a machine learning model, in accordance with some example embodiments. As shown in FIG. 2C, the data processing pipeline 250 may be constructed to include an orchestrator node 230 and one more preparator nodes such as, for example, a preparator node 240. Furthermore, the data processing pipeline 250 may be constructed to include one or more executor nodes including, for example, an executor node 280. Alternatively and/or additionally, the data processing pipeline 250 may be constructed to include one or more auxiliary operator nodes including, for example, a start node 260, a user interface node 270, and a graph terminator node 290. The start node 260 may receive an initial configuration to generate a machine learning model as specified, for example, by the user 125 at the client device 120. Meanwhile, the user interface node 270 may be configured to generate and/or update the user interface 150 to display, at the client device 120, a progress of executing the data processing pipeline 200. The graph terminator node 290 may be invoked to terminate the execution of the data processing pipeline 250.

In some example embodiments, the preparator node 240 may be configured to validate and preprocess an input dataset received, for example, from the client device 120. Furthermore, the preparator node 240 may be configured to generate, based at least on the input dataset, a training dataset and a validation dataset. For example, the input dataset may include text associated with one or more errors reported to an issue tracking system. The preparator node 240 may validate the input dataset and terminate additional processing of the input dataset in response to identifying one or more errors present in the input dataset. Upon validating the input dataset, the preparator node 240 may preprocess the input dataset including by removing invalid rows and/or columns of data from the input dataset as well as encoding any text included in the input dataset. The preparator node 240 may partition the validated and preprocessed input dataset into a training dataset for training a machine learning model to perform text classification and a validation dataset for evaluating a performance of the trained machine learning model performing text classification.

In some example embodiments, the executor node 280 may be configured to execute, based on the training dataset and/or the validation dataset generated by the preparator node 240, one or more machine learning trials. Each machine learning trial may include applying, to the training dataset and/or the validation dataset, a machine learning model having a specific set of trial parameters. The set of trial parameters may include one or more parameters of the machine learning model such as, for example, the initial weights applied by the machine learning model prior to training. Furthermore, the set of trial parameters may include one or more hyper-parameters of the machine learning model including, for example, the learning rate (e.g. step size) of a neural network, the value of the constant k in a k-nearest neighbors clustering algorithm, the cost and sigma associated with a support vector machine, and/or the like. It should be appreciated that the executor node 280 may be configured to execute a sequence of machine learning trials, each of which including a different type of machine learning model and/or a different set of trial parameters. For instance, the executor node 280 may execute a first machine learning trial by at least applying, to the training dataset and/or the validation dataset, a first machine learning model having a first set of trial parameters. The executor node 280 may also execute a second machine learning trial by at least applying, to the training dataset and/or the validation dataset, the first machine learning model having a second set of trial parameters or a second machine learning model having a third set of trial parameters.

In some example embodiments, the orchestrator node 230 may be configured to coordinate the operations of the preparator node 240 and the executor node 280. The orchestrator node 230 may respond to receiving, from the start node 260, the initial configurations for implementing the machine learning model by at least triggering, at the preparator node 240, the generation of the training dataset and the validation dataset. The initial configuration may include, for example, a type of task (e.g., classification, regression, and/or the like), a target column (e.g., column in the training dataset corresponding to a ground-truth label), a target metric (e.g., accuracy), column names and/or types in the training dataset and the validation dataset, a computational resource budget (e.g., maximum execution time and/or the like), a path to an output directory, a path to the training dataset, a path to a validation dataset, and/or the like.

Upon receiving, from the preparator node 240, an indication that the preparator node 240 has generated the training dataset and the validation dataset, the orchestrator node 230 may determine a machine learning model including a set of model parameters and hyper-parameters for performing the task associated with the input dataset (e.g., classify text associated with an issue tracking system and/or the like). For example, the orchestrator node 230 may determine a machine learning model including a set of model parameters and hyper-parameters for performing the task associated with the input dataset by at least triggering, at the executor node 280, the execution of one or more machine learning trials, each of which including a different type of machine learning model and/or a different set of trial parameters. The orchestrator node 230 may trigger, at the executor node 280, a quantity of machine learning trials that is consistent with the computational resource budget set forth in the initial configurations for implementing the machine learning model. For instance, the orchestrator node 230 may trigger an additional machine learning trial based at least on a quantity of remaining computational resource being sufficient to support the execution of the additional machine learning trial.

In some example embodiments, the trial parameter set used for a machine learning trial may be selected randomly from a hyper-parameter space that includes parameters governing the configuration of the data processing pipeline 250 as well as the configuration of each node within the data processing pipeline 250. A machine learning model including a set of model parameters and hyper-parameters for performing the task associated with the input dataset may be identified by applying an information-based optimization technique (e.g., a Bayesian hyper-parameter optimizer and/ or the like), which may start with a random set of trial parameters before incorporating the corresponding result to identify regions in the hyper-parameter space that are most likely to include the set of model parameters and hyper-parameters associated with the machine learning model that is identified, within the available time budget, as being most suitable for the task associated with the input dataset. With each successive update, the sampling of the hyper-parameter space may shift from a uniform sampling (e.g., from a uniform distribution of trial parameters to yield a random sampling in which each trial parameter has an equal probability of being sampled) to an information-weighted sampling using Bayesian (or other) methods.

The execution of a particular type of a machine learning model may depend on hyper-parameters such as, for example, the quantity of trees created when training a random forest model, the solver algorithm applied to train a multi-layer perceptron model, and/or the like. A corresponding hyper-parameter space may include different types of hyper-parameters including, for example, categorical non-numerical values, quantifiable integer values, quantifiable continuous values, and/or the like. Examples of categorical non-numerical values include the solver algorithm of a multi-layer perceptron model, a Boolean flag controlling the fit of the intercept in a linear regression model, and the switch to select a certain algorithm in each step of the data processing pipeline implementing a machine learning model. A quantifiable integer value may be restricted to certain multiples of a base value such as the maximum depth of a random forest model (e.g., a range from a first value x to a second value y) or the quantity of trees for the random forest model described by a finite quantized set (e.g., {20, 30, 40, . . . , 240, 250}). Likewise, a quantifiable continuous value may also be restricted to certain multiples of a base value such as the L1 penalty for a Elastic Net regression model (e.g., a range from a first value x to a second value y in multiples of a third value z) and the learning rate for an XGBoost model (e.g., ranges from $10^{-3}$ to 1 in multiples of $10^{-3}$).

While the sampling of the hyper-parameter space is typically uniform, with value having a same probability of occurring, a log-scale sampling may be applied for some numerical hyper-parameters such as learning rates. The effects of the log-scale sampling may be to impose a uniform sampling across the order of magnitudes of the corresponding hyper-parameter space. Thus, a learning rate of $10^{-4}$ may be as likely as a learning rate of $10^{-1}$ with log-scale sampling while a learning rate of $10^{-1}$ is far less likely with a typical uniform sampling. In some cases, the hyper-parameter space may be further extended through rules excluding certain combinations of parameter values. For example, unlike other types of machine learning models, a multi-layer perceptron model may always require the normalization of numerical values in order to achieve good results. Thus, the hyper-parameter space may be prevented from including a combination of parameters in which the non-normalization of numerical values and a multi-layer perceptron model are selected at a same time. In the context of FIG. 2A, doing so may be tantamount to excluding certain combinations of the pipeline elements shown in FIG. 2A.

The executor node 280 may execute the first machine learning trial including the first machine learning model having the first set of trial parameters and the second machine learning trial including the first machine learning model having the second set of trial parameters or the second machine learning model having the third set of trial parameters. Accordingly, the orchestrator node 230 may select, based at least on the respective performances of the first machine learning model having the first set of trial parameters, the first machine learning model having the second set of trial parameters, and/or the second machine learning model having the third set of trial parameters, the machine learning model including the set of model parameters and hyper-parameters for performing the task associated with the input dataset. Upon selecting the machine learning model including the set of model parameters and hyper-parameters for performing the task associated with the input dataset, the orchestrator node 230 may terminate the execution of the data processing pipeline 250 including by sending, to the graph terminator node 290, a message to terminate the execution of the data processing pipeline 250.

As noted, the executor node 280 may execute the first machine learning trial and the second machine learning trial in sequence. However, it should be appreciated that the data processing pipeline 250 may be constructed to include multiple executor nodes and that orchestrator node 230 may coordinate the operations of the multiple executor nodes executing multiple machine learning trials in parallel. Moreover, the data processing pipeline 250 may be constructed to include multiple preparator nodes and the orchestrator node 230 may coordinate the operations of multiple preparator nodes generating the input dataset and the validation dataset in parallel.

In some example embodiments, the orchestrator node 230, the preparator node 240, and the executor node 280 may communicate via one or more messages. However, these messages may exclude intermediate data such as, for example, the training dataset and the validation dataset generated by the preparator node 240. Instead, the orchestrator node 230, the preparator node 240, and the executor node 280 may exchange intermediate data via a shared persistence 115 accessible to the orchestrator node 230, the preparator node 240, and the executor node 280. For example, the orchestrator node 230 may store, in the shared persistence 115, at least a portion of the initial configurations that includes the input dataset associated with the specified task. Likewise, the preparator node 240 may store, in the shared persistence 115, the training dataset and the validation dataset generated based on the input dataset. Instead of sending the input dataset, the training dataset, and the validation dataset directly, the orchestrator node 230, the preparator node 240, and the executor node 280 may exchange the input dataset, the training dataset, and/or the validation dataset by at least sending messages indicating the availability of the input dataset, the training dataset, and/or the validation dataset in the shared persistence 115. Accordingly, the preparator node 240 may access the shared persistence 115 to retrieve the input dataset in order to generate the training dataset and the validation dataset while the executor node 280 may access the shared persistence 115 to retrieve the training dataset and the validation dataset for use during the execution of the one or more machine learning trials.

Figure 3A:
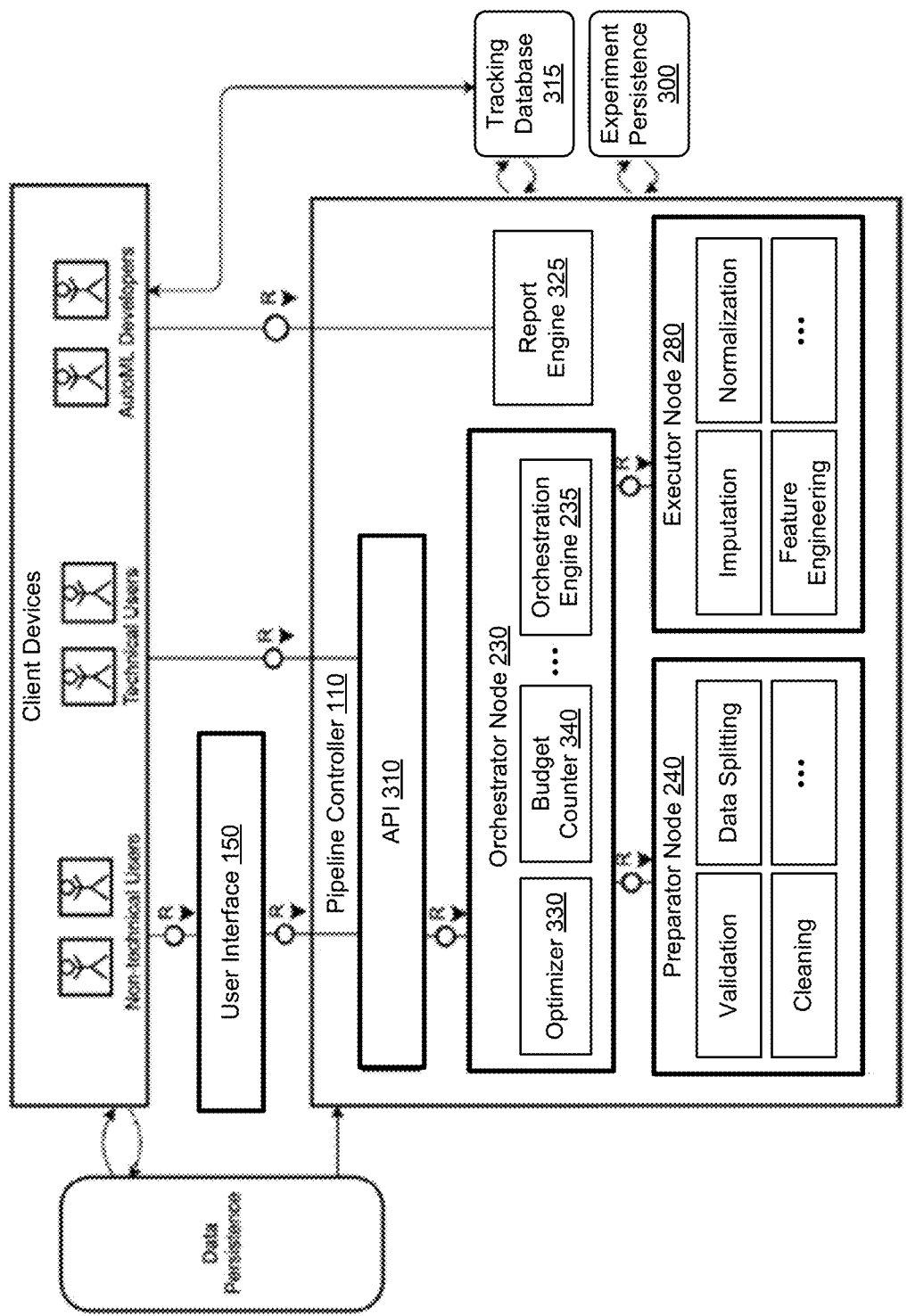
FIG. 3A depicts a block diagram illustrating an example communication flow between the operator nodes forming a data processing pipeline configured to generate a machine learning model, in accordance with some example embodiments.

FIG. 3A depicts a block diagram illustrating an example communication flow between the operator nodes forming the data processing pipeline 250 configured to generate a machine learning model, in accordance with some example embodiments. Referring to FIG. 3A, the orchestrator node 230, the preparator node 240, and the executor node 280 may exchange intermediate data by at least accessing an experiment persistence 300, which may form a part of the shared persistence 115 shown in FIG. 1A. As shown in FIG. 3A, the user 125 at the client device 120 may interact with the user interface 150 to specify, via an application programming interface 310, the initial configurations for the machine learning model performing a task such as, for example, object identification, natural language processing, information retrieval, speech recognition, classification, and/or regression. In response to receiving the initial configurations for the machine learning model, the orchestrator node 230 may trigger, at the preparator node 240, the generation of the training dataset to train the machine learning model to perform a specified task and the validation dataset to evaluating a performance of the trained machine learning model performing the specified task. The preparator node 240 may store, in the experiment persistence 300, the training dataset and the validation dataset. Moreover, the preparator node 240 may send, to the orchestrator node 230, the first message notifying the orchestrator node 230 of the availability of the training dataset and the validation dataset.

In response to the first message from the preparator node 240, the orchestrator node 230 may send, to the executor node 280, the second message to trigger the execution of one or more machine learning trials. For example, the executor node 280 may respond to the second message by at least executing the first machine learning trial including the first machine learning model having the first set of trial parameters and/or the second machine learning trial including the first machine learning model having the second set of trial parameters or the second machine learning model having the third set of trial parameters. The executor node 280 may further store, in the experiment persistence 300, the results of the machine learning trials corresponding, for example, to the respective performances of the first machine learning model having the first set of trial parameters, the first machine learning model having the second set of trial parameters, and/or the second machine learning model having the third set of trial parameters. In order to identify the machine learning model including the set of model parameters and hyper-parameters for performing the specified task, the orchestrator node 230 may at least access the experiment persistence 300 to evaluate the results of the machine learning trials relative, for example, to the target metric specified by the user 125 as part of the initial configurations for the machine learning model.

The data processing pipeline 250 including the orchestrator node 230, the preparator node 240, and the executor node 280 may be executed to perform feature extraction, feature pre-processing, and training of a machine learning model. For example, the feature extraction may be performed to generate numerical features based on one or more columns of data from the input dataset including by encoding categorical features and/or extracting values from the data fields in each column. The feature-preprocessing may include a normalization of values occupying one or more columns in the input dataset. Accordingly, the machine learning model may be trained by at least applying the machine learning model to the numerical columns generated by the feature extraction and/or the feature pre-processing.

In some example embodiments, the data processing pipeline 250 may be configured to adapt dynamically based on the metrics and/or configuration of the input dataset. Furthermore, the data processing pipeline 250 may adapt dynamically based on one or more previous processing operations in the data processing pipeline 250. As such, some operations may be omitted from the data processing pipeline 250 to reduce operation cost, minimize training time, and increase the accuracy of the resulting machine learning model. For example, whether the executor node 280 performs feature selection may be contingent upon the quantity of available features. That is, the executor node 280 may perform feature selection if more than a threshold quantity of features are available. The executor node 280 may also avoid subjecting embedded columns to any additional processing in order to avoid distorting the embedding space. In the event the input dataset does not include any columns with textual data, the executor node 280 may omit any text encoding, thereby reducing the hyper-parameter space. Moreover, the executor node 280 may also exclude the one or more column from the input dataset determined to have below-threshold information value such as, for example, columns with below threshold value target cross-entropy.

In some example embodiments, the quantization of a hyper-parameter may be adapted based on the metrics of the input dataset including, for example, the quantity of columns and/or the quantity of unique values across columns containing certain datatypes. As used herein, the "quantization" of hyper-parameter may refer to the discrete values that the hyper-parameter may take on during each machine learning trial. For example, if the hyper-parameter column sampling rate yields substantially the same results at 10% and at 12%, then the hyper-parameter column sampling rate may be varied at increments of 20% for each machine learning trial.

Figure 3B:
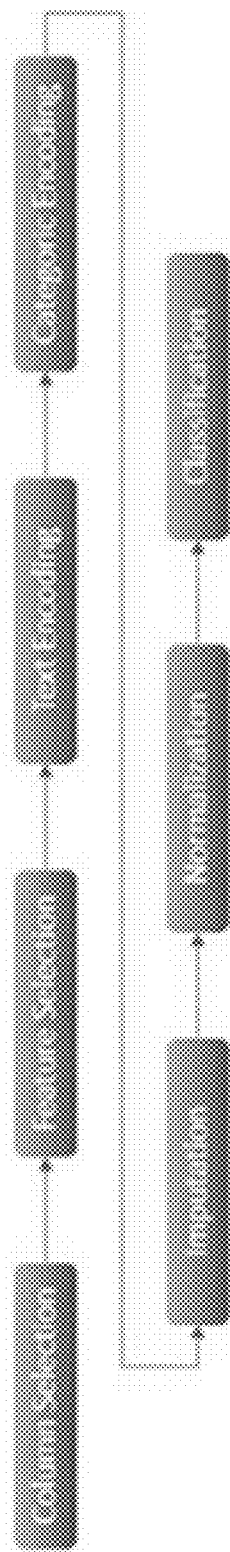
FIG. 3B depicts a flowchart illustrating examples of the data processing operations performed by an executor node forming a data processing pipeline configured to generate a machine learning model, in accordance with some example embodiments.

FIG. 3B depicts a flowchart illustrating examples of the data processing operations performed by the executor node 280 forming the data processing pipeline 250 configured to generate a machine learning model, in accordance with some example embodiments. In some example embodiments, the executor node 280 may respond to the second message from the orchestrator node 230 by at least accessing the shared persistence 115 to retrieve the training dataset and/or the validation dataset generated by the preparator node 240. The executor node 280 may perform, on the training dataset and/or the validation dataset, a sequence of data processing operations, each of which applying a different transformation on the training dataset and/or the validation dataset. As shown in FIG. 3B, the executor node 280 may perform data processing operations that include, as the example, a column selection operation, a feature selection operation, a text encoding operation, a categorical encoding operation, an imputation operation, a normalization operation, a classification operation, and/or the like.

In some example embodiments, the executor node 280 performing a single machine learning trial may generate a corresponding candidate machine learning model having a specific set of parameters and/or hyper-parameters. The executor node 280 may store, in the shared persistence 115 (e.g., the experiment persistence 300), the candidate machine learning model. Moreover, the executor node 280 may send, to the orchestrator node, the result of the machine learning trial, which may correspond to the performance of the candidate machine learning model operating on the validation dataset. For example, the executor node 280 may store, in the shared persistence 115 (e.g., the experiment persistence 300), the result of the machine learning trial such that the orchestrator node 230 may access the shared persistence 115 (e.g., the experiment persistence 300) to retrieve the result of the machine learning trial. As noted, the orchestrator node 230 may access the shared persistence 115 (e.g., the experiment persistence 300) in order to evaluate the results of one or more machine learning trials and identify a machine learning model including a set of model parameters and hyper-parameters for performing the task specified by the user 125 at the client device 120.

Figure 3D:
FIG. 3D depicts another example of a user interface, in accordance with some example embodiments.
Figure 3E:
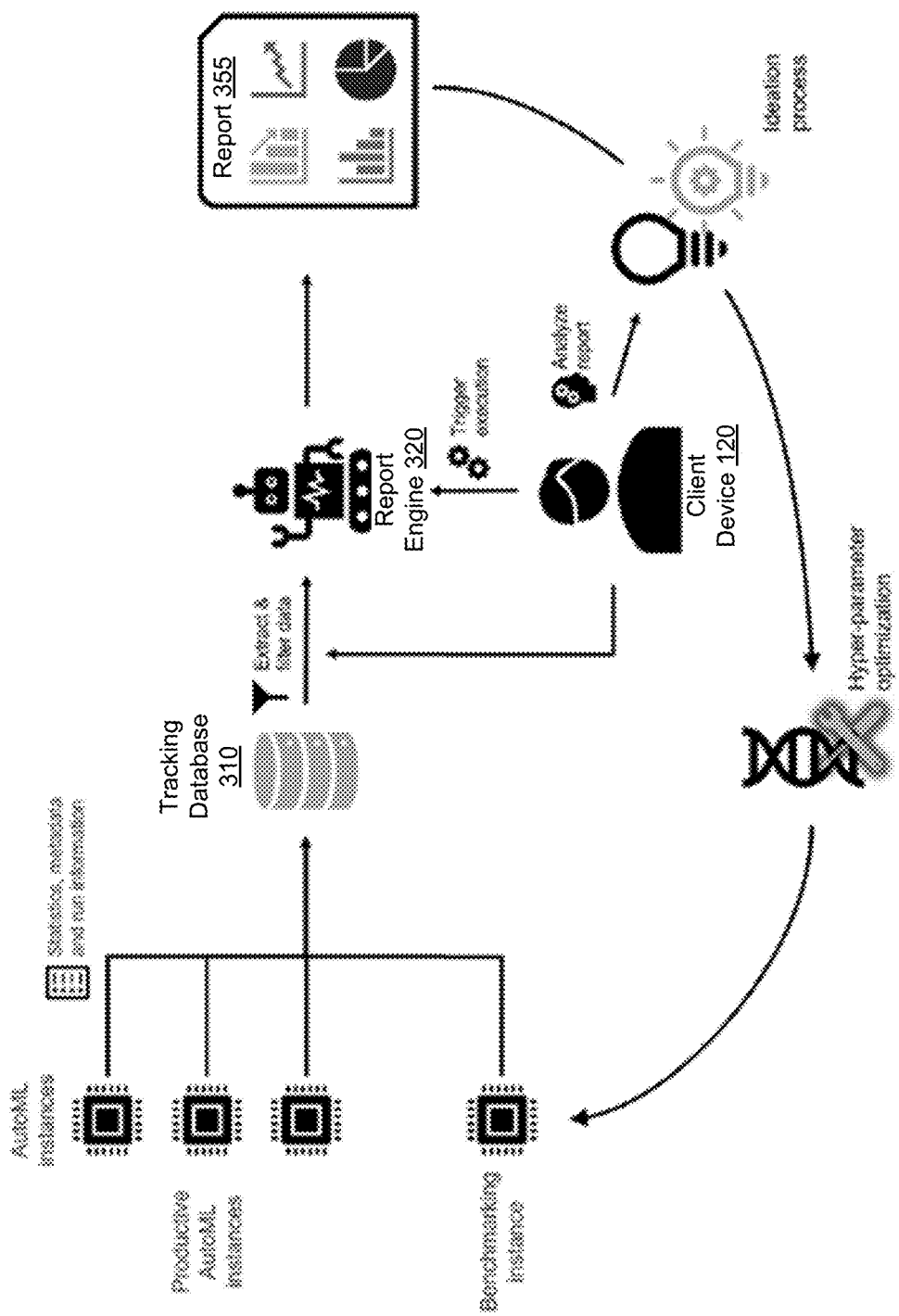
FIG. 3E depicts a schematic diagram illustrating an example of hyper-parameter space optimization, in accordance with some example embodiments.

FIGS. 3C-D depict examples of the user interface 150, in accordance with some example embodiments. As shown in FIGS. 3C-D, the user interface 150 may be updated to display, at the client device 120, a progress as well as a result of the one or more machine learning trials. For example, the user interface 150 may be updated to display, at the client device 120, a model accuracy, a calibration curve, a confusion matrix, a significance of each feature (e.g., a relevance of each column in the training dataset for a machine learning model), and/or the like. In the example of the user interface 150 shown in FIG. 3C, the progress and the results associated with multiple types of machine learning models may be sorted in order to identify the one or more machine learning model having a best result. FIG. 3D depicts an example of the user interface 150 displaying the progress and the result of a single type of machine learning model (e.g., an XGBoost Classifier).

In some example embodiments, optimization of the hyper-parameter space may be enabled by a tracking database 315 and a report engine 325. The tracking database 315 may be a relational database that is communicatively coupled to the pipeline controller 110. During the experimentation phase, the tracking database 110 may be used centrally and filled with data about the hyper-parameter. To enhance security and privacy, the tracking database may be strictly independent of the experiment persistence 300, which may be a customer-specific database containing experiment results accessible to a single customer. Contrastingly, the tracking database 315 may be is a central database from which the pipeline controller 110 collects anonymous experiment data.

containing task metadata, experiment configuration, and trial configuration (e.g., hyper-parameter values). The executor node 280 may send, to the orchestrator node 230, one or more messages containing the results of each machine learning trial including, for example, timing information, performance metrics (e.g. accuracy), and/or the like.

The orchestrator node 230 may be configured to collect, for storage in the tracking database 315, information enabling hyper-parameter space analysis and optimization. This information may include task metadata, experiment configuration, the trial configuration, and performance metrics. The orchestrator node 230 may avoid collecting confidential information. Instead, the orchestrator node 230 may collect, from each user's dataset, non-personal identifiable information such as, for example, the quantity of rows, the quantity of categorical features, and/or the like. The report engine 325 may therefore analyze the collected data based on standard product terms and conditions. Moreover, the report engine 325 may perform analysis across different systems (e.g., different productive systems) and a build system running the pipeline controller 110 on a set of predefined benchmark datasets. Doing so may enable the report engine 325 to gather insights from many scenarios at the same time.

In some example embodiments, to generate reports, the data the orchestrator node 230 collects for the tracking database 310 may need to exhibit a certain format. This may be accomplished at the tracking database 310, for example, by de-normalizing the data. For example, the data collected by the orchestrator node 230, including task metadata, trial configuration, and target performance metrics, may be joined into a single logical table. In the resulting database view of the data, each row may correspond to a single machine learning trial while the columns within each row may include values describing the machine learning trial, the corresponding experiment, and the results of the machine learning trial. Table 1 below depicts an example of de-normalized data including task metadata, trial configuration (e.g., with the hyper-parameter values), and the trial results. It should be appreciated that the table may contain many more columns in particular to accommodate the numerous task metadata and trial configurations associated with an actual machine learning pipeline.

TABLE 1

| Exp. | # rows | # categoric columns | Algorithm | # trees for RF | SGD learning rate | Rank | Accuracy | Error | Training time |
|---|---|---|---|---|---|---|---|---|---|
| 1 | 10000 | 2 | Random forest | 80 | n/a | 2 | 95% | No | 5.4 |
| 1 | 10000 | 2 | Random forest | 150 | n/a | 1 | 97% | No | 3.2 |
| 1 | 10000 | 2 | SGD | n/a | 0.05 | 3 | 84% | No | 0.5 |
| 1 | 10000 | 2 | SGD | n/a | 1.00 | n/a | n/a | Yes | n/a |
| 2 | 25000 | 4 | Linear regression | n/a | n/a | 2 | 65% | No | 6.2 |
| 2 | 25000 | 4 | Random forest | 75 | n/a | 1 | 72% | No | 4.9 |
| | Task metadata | | | Trial configuration/hyper-parameters | | | Trial result | | |

The report engine 325 may be a part of the pipeline controller 110. The report engine 325 may be configured to analyze experiment results and generate complex hyper-parameter space reports. To enhance privacy and security, access to the report engine 325 may be limited to certain users, such as developers. As noted, during the execution of the data processing pipeline 250, various components of the pipeline engine 110, such as the orchestrator node 230 and the executor node 280, may exchange messages to convey status information. For example, the orchestrator node 230 may send, to the executor node 280, one or more messages In some example embodiments, the database capabilities of the tracking database 315 may be used to enrich the de-normalized data, for example, by adding flags and other derived quantities. Examples of enriching target information include adding ranks to metrics across experiments with different datasets to render the metrics comparable (e.g., sort the machine learning trials associated with an experiment by a target metric and adding a new column indicating each trial's rank). The enrichment may also include determining a relative deviation from the target metric (e.g., area-under-curve) on a validation dataset and the same target metric on a test dataset to determine a quantity indicative of an overfitting tendency. That is, a target metric may be determined for the validation dataset and the target dataset, and deviations in the two values may be used to detect overfitting.

In some cases, the enrichment may include flagging one or more machine learning trials included in the de-normalized data. For example, a flag (e.g., a binary value occupying a column of the de-normalized data) may be added to each trial that is worse than the result of a majority voter model, which is the worst reasonable model based on information theory. For each experiment, it should be appreciated that a majority voter model may be the first machine learning trial to be executed during training. For classification tasks, the majority voter model may always predict the majority class with the probability seen in the training dataset. For regression tasks, the majority voter model may predict the mean or the median of the target value distribution in the training dataset, depending on the selected target metric.

In some example embodiments, a flag may be added for each machine learning trial having the worst training runtime (e.g., where the training runtime is in the longest 10% percentile (or another configurable percentile)) of the experiment, thus identifying the machine learning models with the longest training time. Alternatively and/or additionally, a flag may be added for each machine learning trial having the worst inference time (e.g., where the inference runtime is in the longest 10% percentile (or another configurable percentile)) of the experiment to identify the machine learning models taking the longest time to perform inference on the validation dataset. One or more flags may also be added for each machine learning trial having the worst target matric (e.g., where the target metric is in the lowest 10% percentile (or another configurable percentile) for the experiment to identify the models with the worst accuracy. For example, a flag may be added for each one of three task types including binary classification, multi-class classification, and regression. In some cases, a flag may be added for each machine learning trial ending in an error such as an abnormal termination of the model training on the training dataset or performing an inference on the validation dataset.

In some example embodiments, in addition to (or instead of) the aforementioned enrichment, the de-normalized data in the tracking database 315 may be enriched and/or filtered based on one or more user inputs received, for example, from the client device 120. For example, the de-normalized data may be enriched with flags specified by the user inputs. Alternatively and/or additionally, the de-normalized data may be filtered to restrict the analysis of the hyper-parameter space to one or more specific versions of the pipeline controller 110, machine learning trials having certain characteristics (e.g., machine learning trials performing only regression tasks or having at least two numeric columns), or machine learning trials from a specific computing environment (e.g., certain production systems or benchmark results from build system).

In some example embodiments, the report engine 325 may generate, based at least on the de-normalized data from the tracking database 315, a report. The report may be further generated based on a target variable as specified by one or more user inputs from the client device 120. In some cases, the report may be generated in response to a request from the client device 120. However, it should be appreciated that report generation may also be triggered automatically, at fixed time intervals, or upon certain events such as a new release. Moreover, the report may be generated based on association rules or explainability capabilities with an intermediary model.

The impact of categorical hyper-parameters and categorical task metadata information on binary target information, such as the flags added as part of enriching the de-normalized data, may be analyzed using association rules. Doing so may enable an analysis of the impact associated with selecting certain algorithms within the machine learning pipeline (e.g., the model selection or the imputation method for missing values, or the task type) and enable the identification of pipeline elements associated with poor results or an above-average occurrence of errors.

To generate reports based on association rules, the report engine 325 may remove non-categorical features from the de-normalized data. Examples of non-categorical features include numeric features such as the number of rows or the hyper-parameter for the maximum depth of a random forest. The report engine 325 may apply an a priori algorithm (or similar algorithms such as ECLAT algorithm, FP-growth algorithm, and/or the like) to generate a set of rules connecting the categorical features with the target information. Table 2 depicts an example of the resulting rules.

TABLE 2

| | |
|---|---|
| * | normalization:switch_normalization = no_normalizer ∧ classification:switch_classification = multi_layer_perceptron ∧ classification:multi_layer_perceptron:solver = lbfgs ⇒ flag = 1 |
| * | classification:multi_layer_perceptron:solver = lbfgs ∧ flag = ∅ ⇒ classification:switch_classification = multi_layer_perceptron ∧ classification:multi-layer_perceptron: learning_rate = constant |
| * | classification:multi_layer_perceptron:solver = adam ∧ flag = 1 ⇒ normalization:switch_normalization = no_normalizer |
| * | normalization:switch_normalization = minmax_normalizer ∧ classification:switch_classification = naive_bayes ⇒ flag = 0 |
| * | normalization:switch_normalization = no_normalizer ∧ classification:switch_classification = multi_layer_perceptron ⇒ flag = 1 |
| * | ... |

As shown in Table 2, each rule may include one or more conditions (left side) leading to one or more conditions (right side). For example, a flag having a value of "1" may identify a machine learning trial having poor results. Thus, the last rule in the example shown in Table 2 indicates that a poor result is likely to occur if the machine learning pipeline executes with no normalization of numeric values when a multi-layer perceptron model is used as prediction algorithm.

In some example embodiments, the association rule algorithm may be configured to generate a suitable quantity of maximally useful association rules. For example, the association rule algorithm may impose a threshold for the minimum support required for each rule. That is, each association rule must be associated with a threshold proportion of the de-normalized data (e.g., a certain percentage of rows). This threshold may be set below the proportion of positive flags. Thus, if a positive flag occurs with 4% of all machine learning trials, the minimum support threshold may be set to no more than 2%. Alternatively and/or additionally, the association rule algorithm may impose a threshold to the quantity of conditions associated with each rule. This threshold may be set to one but increased to two if there are no rules with less than two conditions.

In some cases, the report generator 325 may filter association rules that fail to extract connections between a hyper-parameter and the occurrence of a flag associated with a target metric. In doing so, the report generator 325 may exclude association rules that do not explain why a flag occurs (or fails to occur). Accordingly, the condition of a positive flag may be the condition on a right side of an association rule. This also implies that the remaining association rules may have categorical features conditions on the left side. Table 3 depicts examples of such association rules.

TABLE 3

| | |
|---|---|
| * | normalization:switch_normalization = no_normalizer ∧ classification:switch_classification = multi_layer_perceptron ∧ classification:multi_layer_perceptron:solver = lbfgs ⇒ flag = 1 |
| * | normalization:switch_normalization = no_normalizer ∧ classification:switch_classification = multi_layer_perceptron ⇒ flag = 1 |
| * | ... |

Upon filtering the association rules, the report generator 325 may sort the association rules based on a likelihood of each association rule explaining the results of the machine learning pipeline. The association rules may be sorted based on ordering rules that look first at the complexity of each rule, as quantified by the number of conditions on the left side of each association rule, because simple rules with fewer conditions on the left side may be preferable over complex rules with more conditions on the left side. When two rules having the same complexity, the sorting then looks at the importance of each rule (in a descending order) as quantified by "lift" or how often an association rule is true. Finally, when two rules have a same complexity and importance, the sorting may be performed based on the support associated with each association rule (in a descending order). Support may indicate of how frequently the condition on the left side of an association rule appears. Because the right side of the association rules are fixed, support may correlate with confidence. To further illustrate, Table 4 below depicts examples of association rules that have been sorted based on complexity, importance, and support.

TABLE 4

| Explanatory rule | Complexity | Lift | Support |
|---|---|---|---|
| normalization:switch_normalization = no_normalizer ∧ classification:switch_classification = multi_layer_perceptron | 2 | 2.5 | 0.10 |
| normalization:switch_normalization = no_normalizer ∧ classification:switch_classification = multi_layer_perceptron ∧ classification:multi_layer_perceptron:solver = lbfgs | 3 | 3.3 | 0.04 |

Instead of association rules, the report engine 325 may also generate reports based on explainability capabilities with an intermediary model. For a detailed assessment of excessive resource consumption or poor results, the report engine 325 may use the entire set of de-normalized data (e.g., task metadata, complete trial configuration, and target metric) as input. The target metric may include one or more numeric values specifying a desired accuracy and/or training time for the machine learning model. Alternatively, the target metric may include one or more Boolean flags indicating errors such as a machine learning model providing poor results or excessive training time.

The report engine 325 may select different subsets of this data and train a random forest model on each subset as an intermediary model to predict the target metric for each machine learning trial in the subset. For example, the report engine 325 may construct a random forest model that takes all hyper-parameter values as input and predicts whether a given machine learning trial exhibits an excessive runtime. This random forest model is not used make predictions on machine learning trials with new hyper-parameter values. It should be appreciated this intermediary model is configured to condense the logical connections between the prepared data and the target metric for subsequent extraction and exploitation.

To obtain condensed information, the report engine 325 may apply a method configured to yield an interpretability or explainability for black-box models. For example, the report engine 325 may apply Shapley Additive Explanations (SHAP) to extract the information and generate a corresponding report. While interpretability techniques typically explain a machine learning model's predictions and rate the importance of various input features, in some example embodiments, an interpretability technique such as Shapley Additive Explanations may be repurposed to extract the logical connections included in the trained random forest model while disregarding the individual explanations of the intermediary model. It should be appreciated that the Shapley Additive Explanations library may apply a game theoretic approach to explain the output of a machine learning model including by connecting optimal credit allocation with local explanations using the classic Shapley values. Shapley Additive Explanations is therefore a solution concept from cooperative game theory. Moreover, Shapley Additive Explanations may provide a high-speed exact algorithm for tree ensemble methods such as the random forest-based intermediary model generated by the report engine 325. Since machine learning models are typically trained, based on some training data, to make then predictions on previously unseen data, libraries such as Shapely Additive Explanations (or alternatives such as Local Interpretable Model-Agnostic Explanations (LIME)) may be applied to explain how the trained machine learning model came to a particular result. Explainability approaches are traditionally not used to extract the logical connections of machine learning models trained solely for the purposes of extracting such connections.

The Shapley Additive Explanations library may calculate the effect of a single feature, such as a hyper-parameter, on the intermediary model predicting the target information (e.g., the accuracy of the machine learning model or the training runtime). The library can further provide a visualization of this effect as a function of the feature value, such as the possible hyper-parameter values, for all the machine learning trials in the dataset. As features can interact with each other, the Shapley Additive Explanations library supports a visualization mode where features are encoded by color to reveal the interaction between different features. In addition, the effect of multiple features (e.g., hyper-parameters) may be aggregated by feature through averaging the absolute impact of each feature for each entry in the input dataset. This is the information that is assessed in order to determine the impact of each hyper-parameter on the defined target information.

In order to support different types of tasks (e.g., binary classification, multi-class classification, regression, and/or the like) with dedicated algorithms and target metrics (e.g. accuracy for classification tasks and mean absolute error for regression tasks), the report engine 325 may run the analysis for each type of task individually. Hence, the report output by the report engine 325 may include a separate section for each type of task. Where a type of task is not associated with any machine learning trials, for example, due to filters indicated by one or more user inputs, the corresponding section of the report may remain empty.

FIG. 5A depicts a table 500 illustrating an example of data used to generate the report. As shown in FIG. 5A, each section of the report may be further divided by using different parts of the input data to explain the connections to the target metric. For example, the structure of the report may follow the type of task and is thus a row-based segmentation of the data (see numerals 1 and 2 in table 500). For the subsections of the report, the data may be divided into subsets of columns that uses features from the task metadata (see numeral 3 in table 500), features representing the hyper-parameters (see numeral 4 in table 500), or the features associated with the task metadata and the features associated with the hyper-parameters (see numeral 5 in table 500) to predict the target metric. In some cases, the report can also be generated using data corresponding to features representing switches that control the pipeline layout (e.g., hyper-parameters selecting algorithm modules). The report is generated in this manner at least because dataset characteristics in the task metadata and the trial configuration can exhibit a high level of correlation that often leads to confusing results. For example, the categoric encoding feature may be active if there are categoric variables, in which case Shapley Additive Explanations (SHAP) may identify the number of categoric variables in the task metadata as the root cause of an error even though the actual cause of the error is the presence of the categoric encoding module. Empty features are automatically excluded from subsequent analysis (e.g. any hyper-parameters associated with categoric encoding in the absence of any categoric input variables).

The report generator 325 may create a structured report for each subset following the aforementioned procedure. The report is generated and provided in electronic form as a structured document (e.g., an HTML document, a PDF file, and/or the like). The report may include a set of charts and a set of corresponding numeric tables providing the numeric values for the effects visualized in the charts (if available). The charts and tables may describe the importance and impact of all features, including hyper-parameters and task metadata entries, with respect to a defined target metric.

Figure 5B:
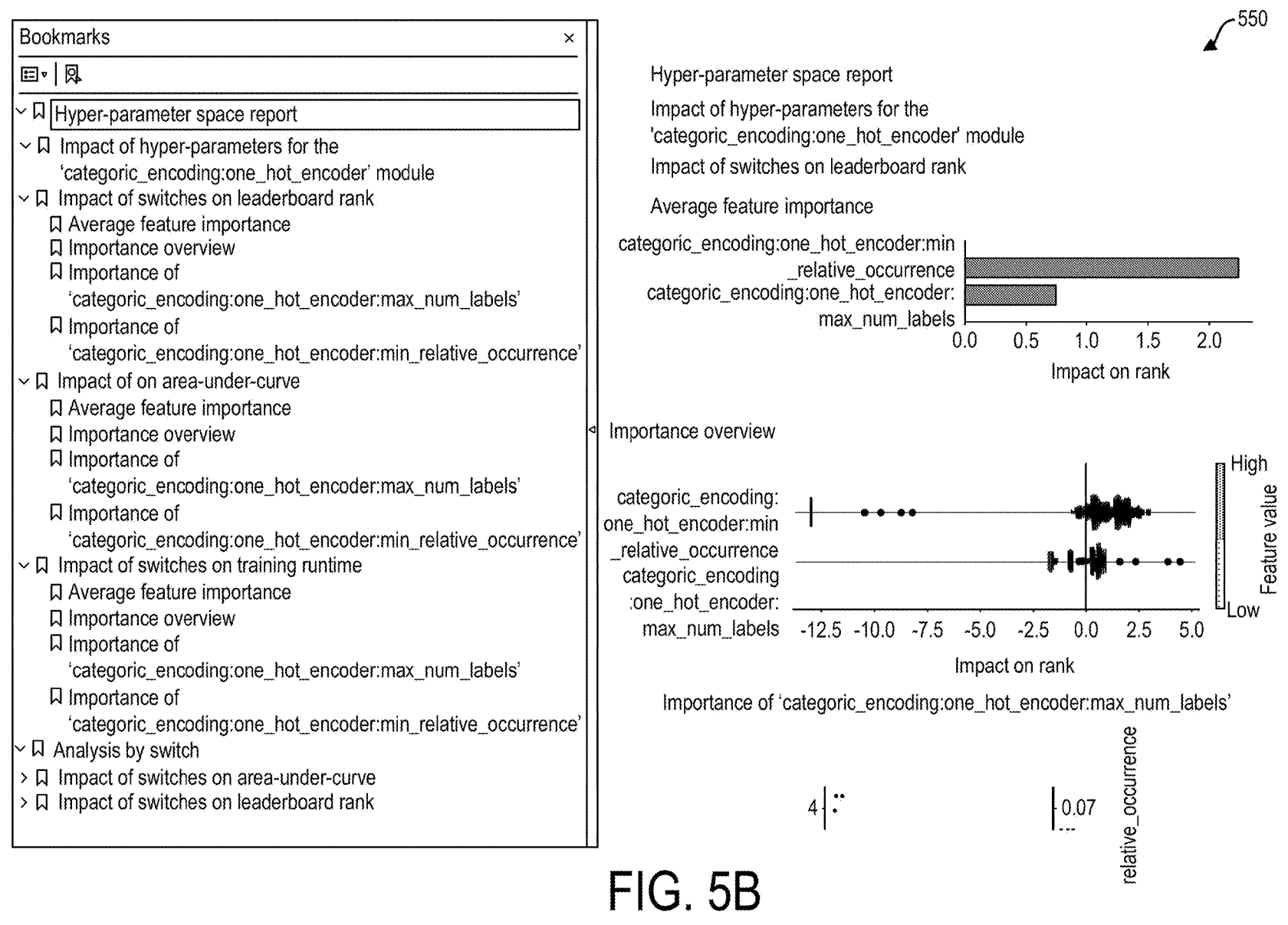
Figure 5C:
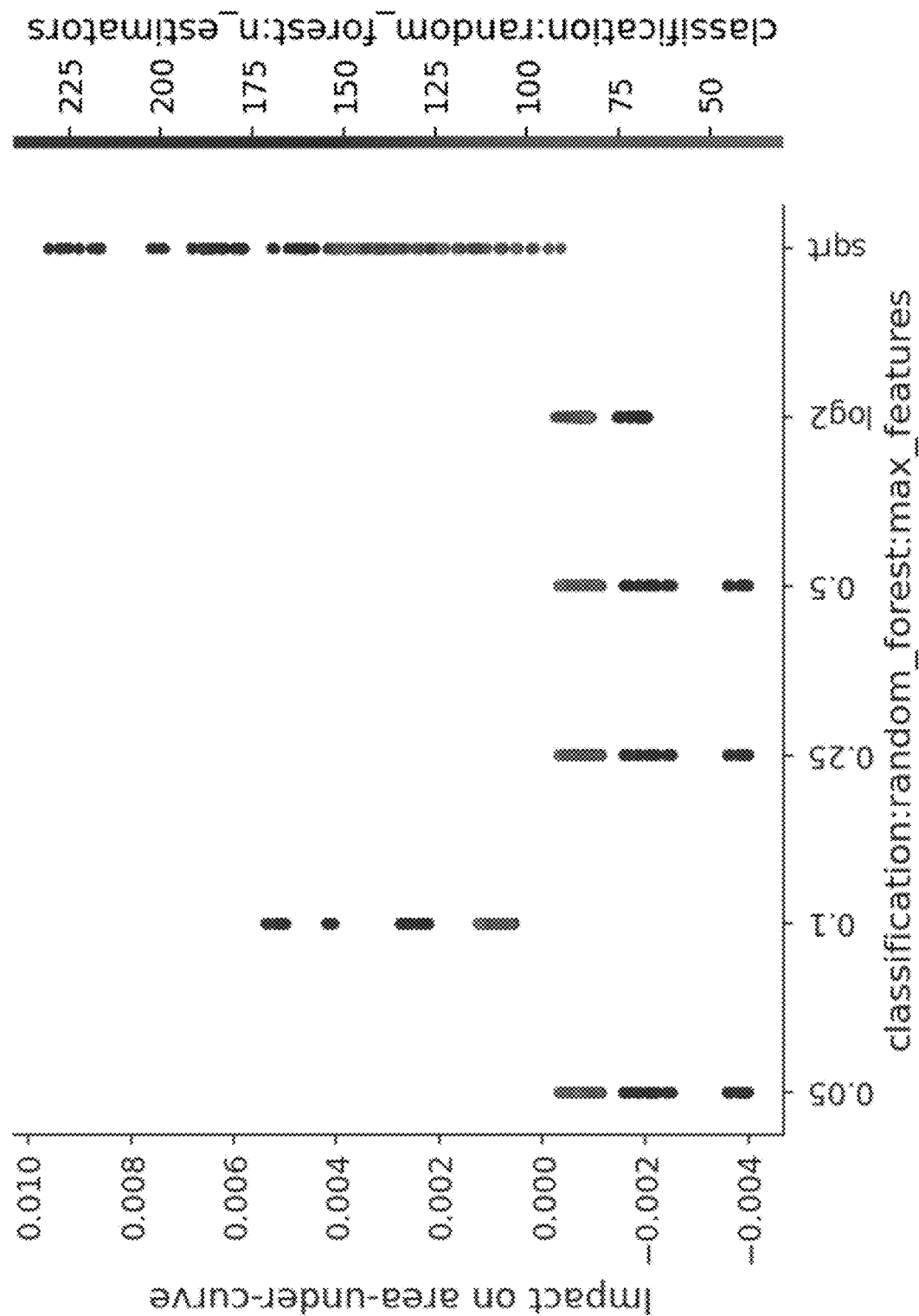
FIG. 5C depicts a graph illustrating an example of a hyper-parameter with a few values leading to a variety of model performances, in accordance with some example embodiments.

FIG. 5B depicts an example of a report 550, in accordance with some example embodiments. The example of the report 550 shown in FIG. 5B includes a bar graph summarizing the importance of each input feature (e.g., a hyper-parameter or a task metadata feature) in the studied subset with respect to the target metric (e.g., the accuracy or the training time). The report 550 also includes a scatter plot summarizing the importance of each input feature in the studied subset with respect to the target metric together with its distribution. Furthermore, the report 550 includes a scatter plot visualizing the effect of a primary variable (x-axis) and a secondary variable (color). This scatter plot is shown in greater detail in FIG. 5C. As shown in FIG. 5C, the scatter plot depicts an example of a hyper-parameter with a few values that give rise to a variety of model performances. It is noteworthy that the secondary axis, which may be encoded in different colors, indicates a good interaction between the maximum number of features to be used and the number of trees when creating a random forest model. Thus, the secondary parameter may improve or degrade the performance of the model depending on the value of the maximum number of features.

Figure 5D:
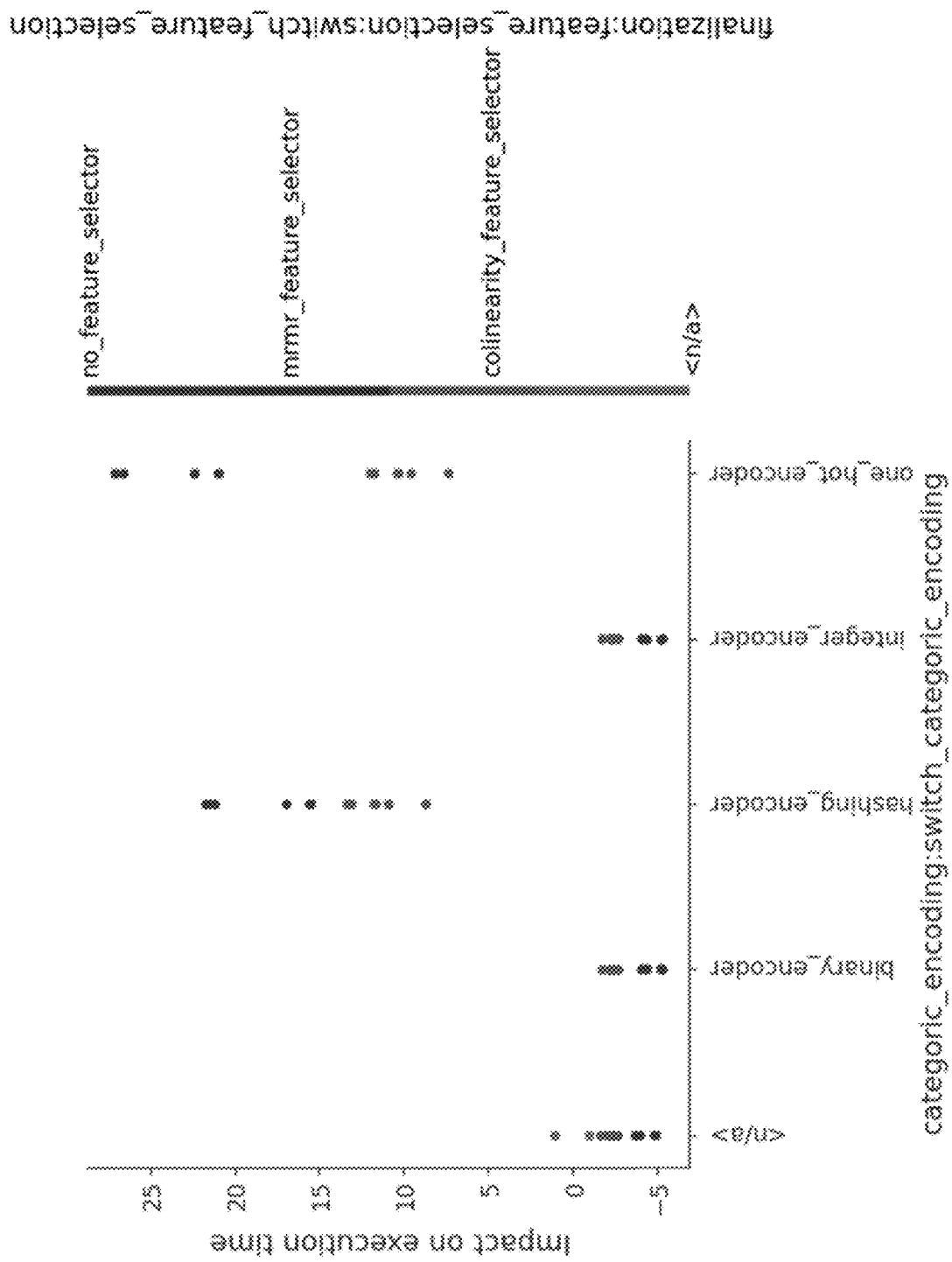
FIG. 5D depicts a graph illustrating an example of a relationship between execution time, categorical encoding, and feature selection, in accordance with some example embodiments.

FIG. 5D depicts another example of a scatter plot providing a visualization of the relationship between the target metric execution time and the categoric encoding (primary, x-axis) and the feature selector (color). The scatter plot show in FIG. 5D shows that both the hash encoder module and the one-hot encoder module can lead to larger training execution times and are thus good candidates for a further performance analysis. The "<n/a>" values shown in FIG. 5D may correspond to experiments without the corresponding pipeline modules. That is, the dataset may lack a categoric features or a feature selection operation.

In some example embodiments, the contents of the report may be used to determine and perform a variety of corrective actions. Examples of corrective actions include identifying hyper-parameter values with unexpected behavior, removing certain hyper-parameters, quantizing of continuous hyper-parameter values, restricting and rescaling parameter ranges, identifying unfavorable combinations of algorithms, detecting poor scaling behavior, and identifying pipeline modules with technical issues.

In some example embodiments, the contents of the report may be applied to identify hyper-parameter values exhibiting unexpected behavior. For example, during tests, in rare cases models created with an XGBoost algorithm were performing worse than a majority voter algorithm, which should be the worst reasonable model based on information theory. The root cause for the performance was identified with a filter on the XGBoost models and by generating a report with a flag for below-threshold trial performance. The XGBoost algorithm is determined to have a parameter which controls the boosting method when building new trees. However, one of the available methods, the DART booster, changes the behavior of the inference step of the model. If this behavior is not considered, the results are unexpectedly bad, albeit in extremely rare and infrequent cases (e.g., one out of eighteen trials).

Figure 6A:
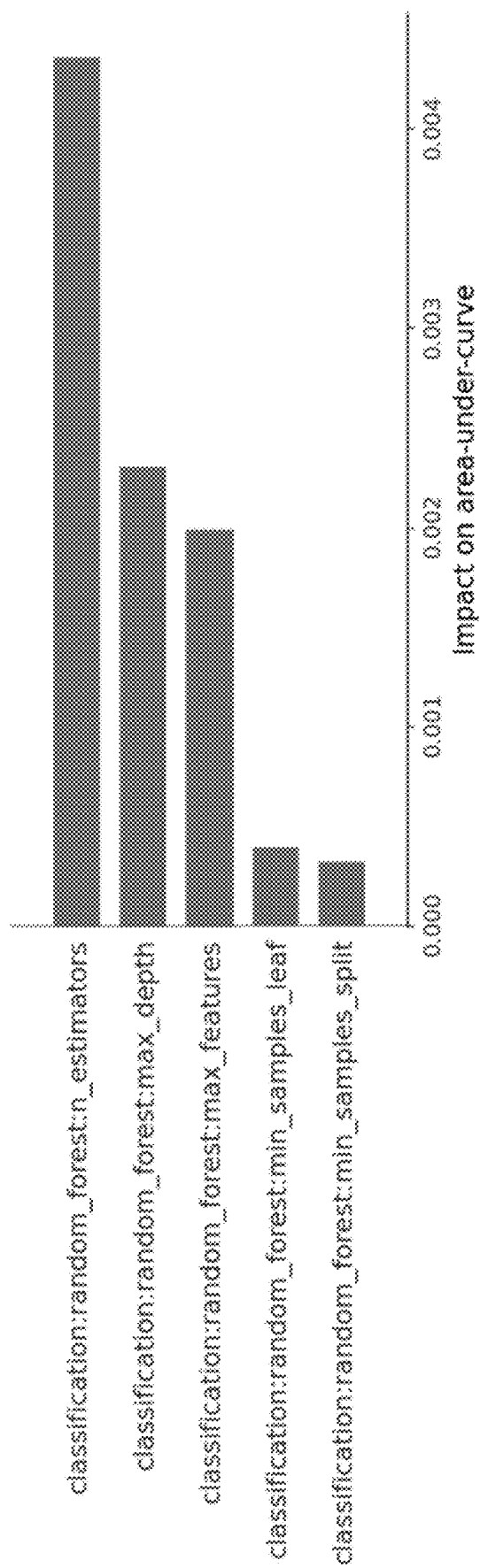
FIG. 6A depicts a graph illustrating the average impact of the hyper-parameters associated with a random-forest classifier, in accordance with some example embodiments.

In some example embodiments, the contents of the report may be applied to remove certain hyper-parameters. The average impact of hyper-parameters associated with a specific module may be used to identify some hyper-parameters for removal. FIG. 6A depicts an example for a random forest algorithm where the minimum number of samples used for a split when creating the trees in the random forest has minimal impact compared to other hyper-parameters such as maximum depth and minimum number of samples per leaf. This hyper-parameter, which the report shows as having minimal impact on the target metric (e.g., area-under-curve in this example) may be a candidate for removal.

Figure 6B:
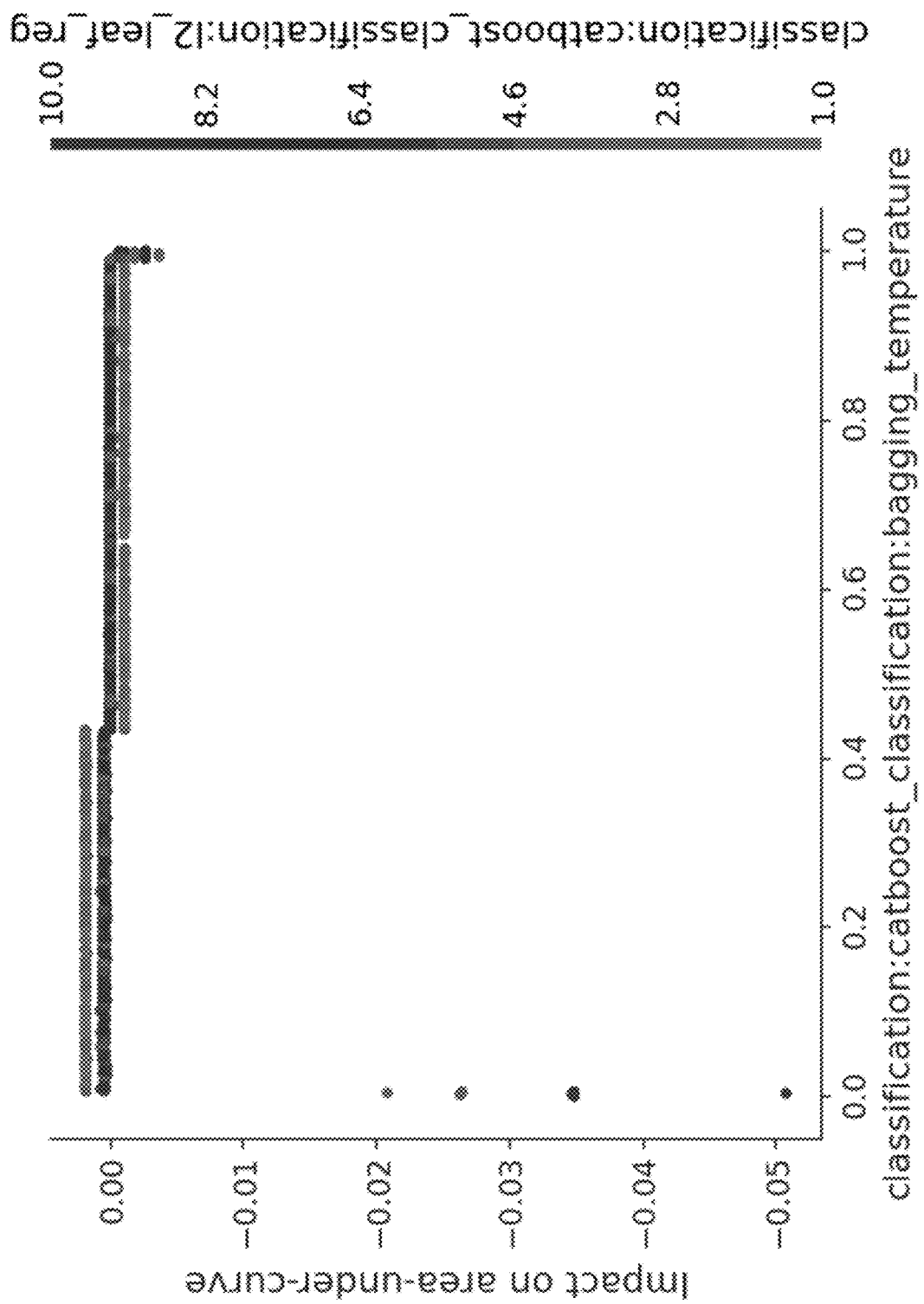
FIG. 6B depicts a graph illustrating an example of a relationship between a hyper-parameter and the area-under-curve metric of a classification model, in accordance with some example embodiments.

In some example embodiments, the contents of the report may be applied to quantize continuous hyper-parameter values. FIG. 6B depicts an example of a hyper-parameter, the bagging temperature parameter for the CatBoost classification model, with two characteristics. First, the bagging temperature hyper-parameter has very small impact on model performance over a broad range of values. Second, at very small values, the bagging temperature hyper-parameter tends to be associated with poor results. Accordingly, the bagging temperature hyper-parameter may be quantized such that the hyper-parameter is permitted to take on certain values (e.g., 0.1, 0.3, 0.5, 0.7 and 0.9) but not others. The quantization of the bagging temperature hyper-parameter may result in a faster hyper-parameter optimization as the parameter space is smaller than with a continuous value range.

Figure 6C:
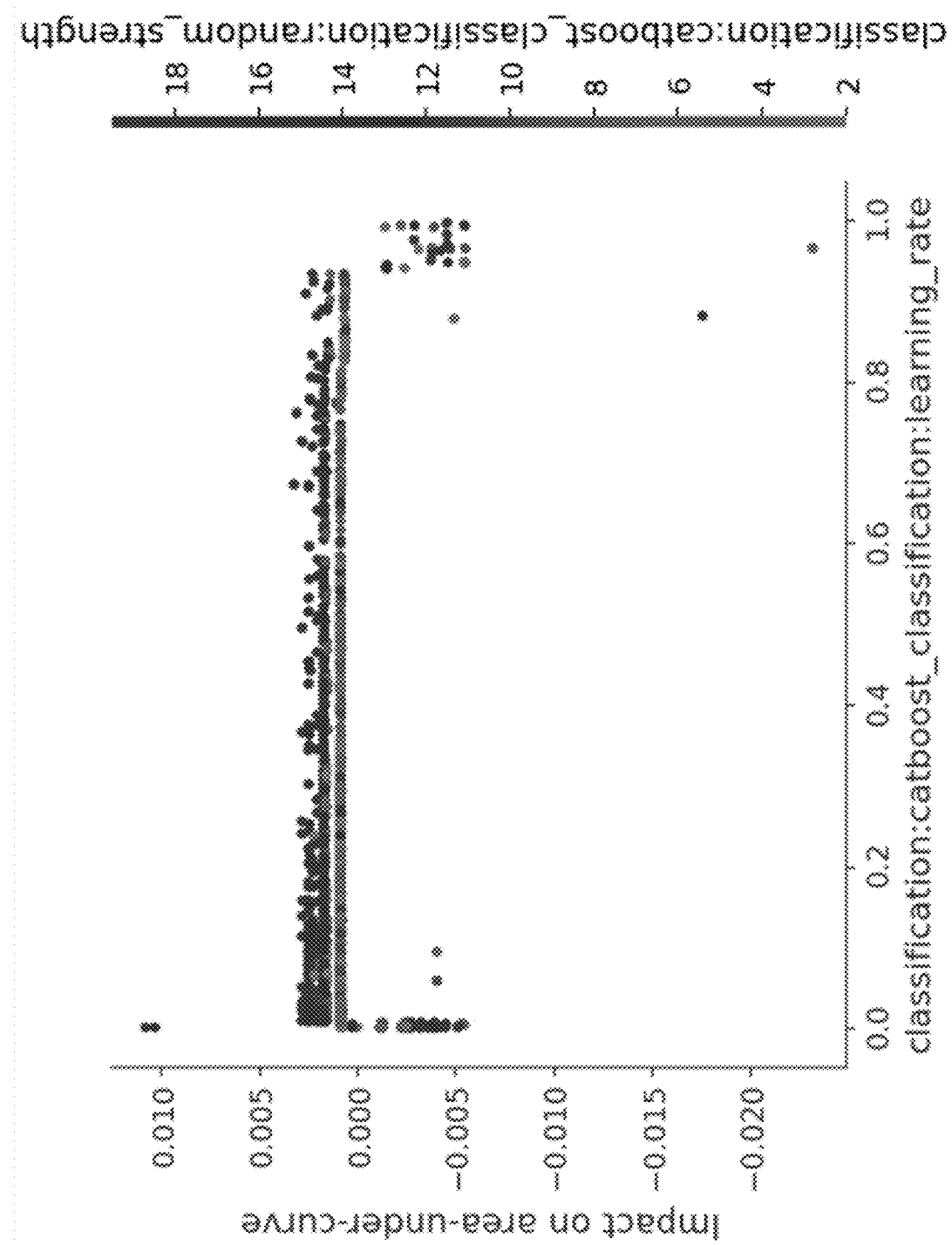
FIG. 6C depicts a graph illustrating an example of a relationship between the learning rate of an example classification model and a target metric, in accordance with some example embodiments.

In some example embodiments, the contents of the report may be applied to restrict and rescale parameter ranges. FIG. 6C depicts an example of a hyper-parameter suitable for a restriction and rescaling of the parameter range. The learning rate used when creating a CatBoost classification model exhibits three characteristics. First, at small values, the classification model may provide good results as well as bad results. Second, over a wide range of values (e.g., 0.2-0.8), the hyper-parameter has no impact on the result of the classification model. Third, at high values, the performance of the classification model is poor. Accordingly, the CatBoost classification model may be optimized by restricting the value of the hyper-parameter to a certain range (e.g., 0-0.5). Alternatively and/or additionally, the CatBoost classification model may be optimized by switching from uniform sampling to uniform log-sampling such that all orders of magnitude are equally likely.

In some example embodiments, the contents of the report may be applied to identify unfavorable combinations of algorithms. The report for categorical hyper-parameters with model performance as a target metric may identify which switches lead to poor model performance. The contents of this report may thus identify that the multi-layer perceptron algorithm yields poor results if numerical values remain unsealed. This observation indicates that certain combinations of algorithms should be prohibited in the hyper-parameter space in order to avoid poor results. For example, the combination of "no normalization" for numerical input features and a multi-layer perceptron model may be rendered impermissible.

In some example embodiments, the contents of the report may be used to detect poor scaling behavior. A check of the impact of model parameters and metadata on the set of benchmark datasets may reveal poor scaling behavior with the XGBoost classification algorithm when applied to multi-class classification problems. While it is expected that algorithms require more time when more label values are present, the XGBoost algorithm exhibits a worse-than-linear scaling behavior instead of the expected linear scaling behavior. These empirical results thus indicate that the XGBoost algorithm should be excluded from classification problems with more than a threshold quantity of label values (e.g., 5 or more).

In some example embodiments, the contents of the report may be applied to identify pipeline modules with technical issues. For trials in the report that have been marked as "invalid" due to feature importance, a measure describing the importance of each column for the model, was not adding up to 1 as it should be. The automatic report for categorical hyper-parameters indicated that the problem is present when the switch for the categoric encoding was set to the integer encoder, in which case a certain type of pipeline module is active to encode categoric variables. This information may enable the analysis of the specific pipeline module to identify an issue within the module's handling of feature information.

Figure 4A:
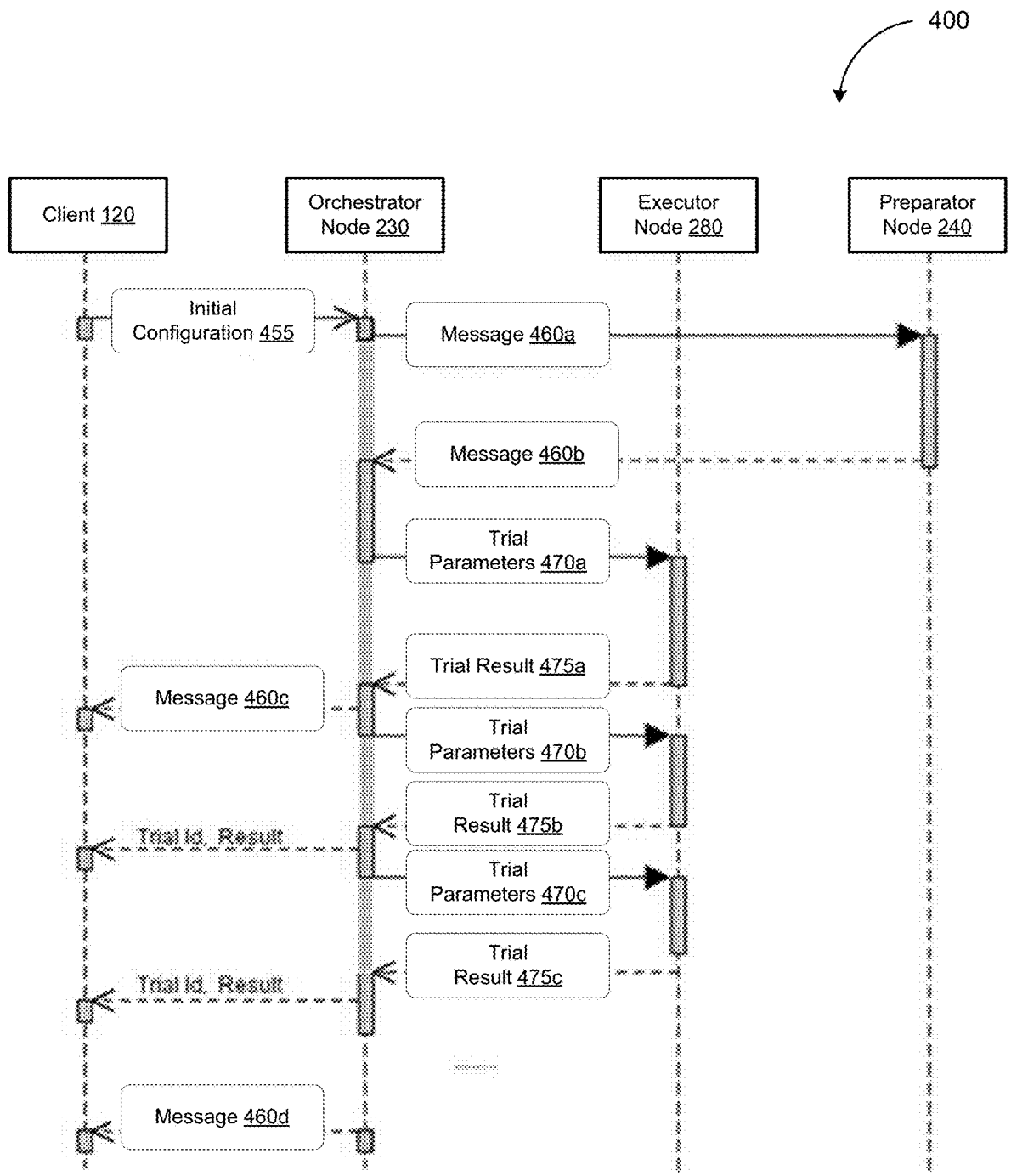
FIG. 4A depicts a sequence diagram illustrating an example of a process for generating a machine learning model trained to perform a task, in accordance with some example embodiments.

FIG. 4A depicts a sequence diagram illustrating a process 400 for generating a machine learning model trained to perform a task, in accordance with some example embodiments. Referring to FIGS. 1, 2A-C, 3A-C, and 4A, the process 400 may be performed by the pipeline controller 110 as part of executing the data processing pipeline 250 to generate a machine learning model having a set of parameters and/or hyper-parameters for performing a cognitive task such as, for example, object identification, natural language processing, information retrieval, speech recognition, classification, and/or regression.

The orchestration node 230, for example, the orchestration engine 235, may receive, from the client device 120, an initial configuration 455 for implementing a machine learning model to perform a cognitive task such as, for example, object identification, natural language processing, informa-tion retrieval, speech recognition, classification, and/or regression. In response to receiving the initial configuration 455 from the client device 120, the orchestrator node 230 may trigger, at the preparator node 240, the generation of a training dataset for training the machine learning model to perform the task and a validation dataset for evaluating a performance of the machine learning model trained to perform the task. As shown in FIG. 4A, the orchestrator node 230 may trigger the generation of the training dataset and the validation dataset by at least sending, to the preparator node 240, a first message 460a. The preparator node 240 may respond to the first message 460a by generating the training dataset and the validation dataset as well as perform one or more preparatory tasks such as the embedding and/or encoding a variety of data (e.g., textual data, numerical data, spatial data, categorical data, and/or the like). When the preparator node 240 completes generating the training dataset and the validation dataset as well as the preparatory tasks, the preparator node 240 may send, to the orchestrator node 230, a second message 460b notifying the orchestrator node 230 of the availability of the training dataset and the validation dataset as well as the results of the preparatory tasks. The preparator node 240 may store the training dataset and the validation dataset in the shared persistence 115 (e.g., the experiment persistence 300) where the training dataset and the validation dataset may be accessible to the orchestrator node 230 and the executor node 280. As such, the preparator node 240 may avoid sending the training dataset and the validation dataset directly to the orchestrator node 230 in the second message 460b.

The orchestrator node 230 may respond to the second message 460b by at least triggering, at the executor node 280, the execution of a first machine learning trial. As shown in FIG. 4A, the orchestrator node 230 may trigger the execution of the first machine learning trial by at least sending, to the executor node 280, a first set of trial parameters 470a. The first set of trial parameters 470a may include one or more parameters of the machine learning model such as, for example, the initial weights applied by the machine learning model prior to training. Furthermore, the first set of trial parameters 470a may include one or more hyper-parameters of the machine learning model including, for example, the learning rate (e.g., step size) of a neural network, the value of the constant k in a k-nearest neighbors clustering algorithm, the cost and sigma associated with a support vector machine, and/or the like. The executor node 280 may execute the first machine learning trial by at least applying, to the training dataset and the validation dataset generated by the preparator node 240, a machine learning model having the first set of trial parameters 470a.

In some example embodiments, the orchestrator node 230 may continue to trigger the execution of additional machine learning trials if there are sufficient remaining computational resources (e.g., execution time and/or the like) to support the execution of additional machine learning trials. For example, FIG. 4A shows the orchestrator node 230 as sending, to the executor node 280, a second set of trial parameters 470b to trigger the execution of a second machine learning trial at the executor node 280 and a third set of trial parameters 470c to trigger the execution of a third machine learning trial at the executor node 280.

The executor node 280 may return, to the orchestrator node 230, a first trial result 475a of executing the first machine learning trial, a second trial result 475b of executing the second machine learning trial, and a third trial result 475c of executing the third machine learning trial. The first trial result 475a, the second trial result 475b, and the third trial result 475c may correspond to a performance of one or more machine learning models having the first set of trial parameters 470a, the second set of trial parameters 470b, and the third set of trial parameters 470c. Moreover, it should be appreciated that the executor node 280 may send the first trial result 475a, the second trial result 475b, and the third trial result 475c to the orchestrator node 230 by at least storing the first trial result 475a, the second trial result 475b, and the third trial result 475c in the shared persistence 115 (e.g., the experiment persistence 300).

According to some example embodiments, the executor node 280 may evaluate the first trial result 475a, the second trial result 475b, and/or the third trial result 475c relative to the target metric specified by the user 125 as part of the initial configurations for the machine learning model in order to identify the machine learning model having the set of parameters and/or hyper-parameters for performing the task. The executor node 280 may select, for example, the first set of trial parameters 470a and the machine learning model associated with the first set of trial parameters 470a based at least on the first trial result 475a being more optimal with respect to the target metric specified by the user 125 than the second trial result 475b and the third trial result 475c. The target metric may be an accuracy of the machine learning model, in which case the first trial result 475a may be more optimal by exhibiting a higher target metric than the second trial result 475b and the third trial result 475c. Alternatively and/or additionally, the target metric may be a log loss, in which case the first trial result 475a may be more optimal by exhibiting a lower target metric than the second trial result 475b and the third trial result 475c In the example shown in FIG. 4A, the orchestrator node 230 may send, to the client device 120, one or more messages indicating a status of the machine learning trials. For instance, the orchestrator node 230 may send, to the client device 120, a third message 460c including the first trial result 475a of the first machine learning trial executed by the executor node 280. Alternatively and/or additionally, the orchestrator node 230 may send, to the client device 120, a fourth message 460d including the third trial result 475c of the third machine learning trial executed by the executor node 280 as well as an indication of a completion of the machine learning trials. The orchestrator node 230 may communicate with to the client device 120 via the user interface node 270, which may be configured to generate and/or update the user interface 150 to display, at the client device 120, at least a portion of the content of the third message 460c and/or the fourth message 460d.

Referring again to FIG. 3A, the orchestrator node 230 of the data processing pipeline 250a may include an optimizer 330, a budget counter 340, and the orchestrator engine 235. In some example embodiments, the optimizer 330 may optimize the execution of the one or more machine learning trials before the orchestrator node 230 triggers, at the executor node 280, the execution of the one or more machine learning trials. The optimizer 330 may optimize the execution of the one or more machine learning trials to reduce overhead, accommodate large training datasets, and eliminate inconsistencies in the result of executing the data processing pipeline 250. The orchestrator node 230 may continue to trigger the execution of successive machine learning trials until the budget counter 340 signals a depletion of the available time budget.

Figure 4B:
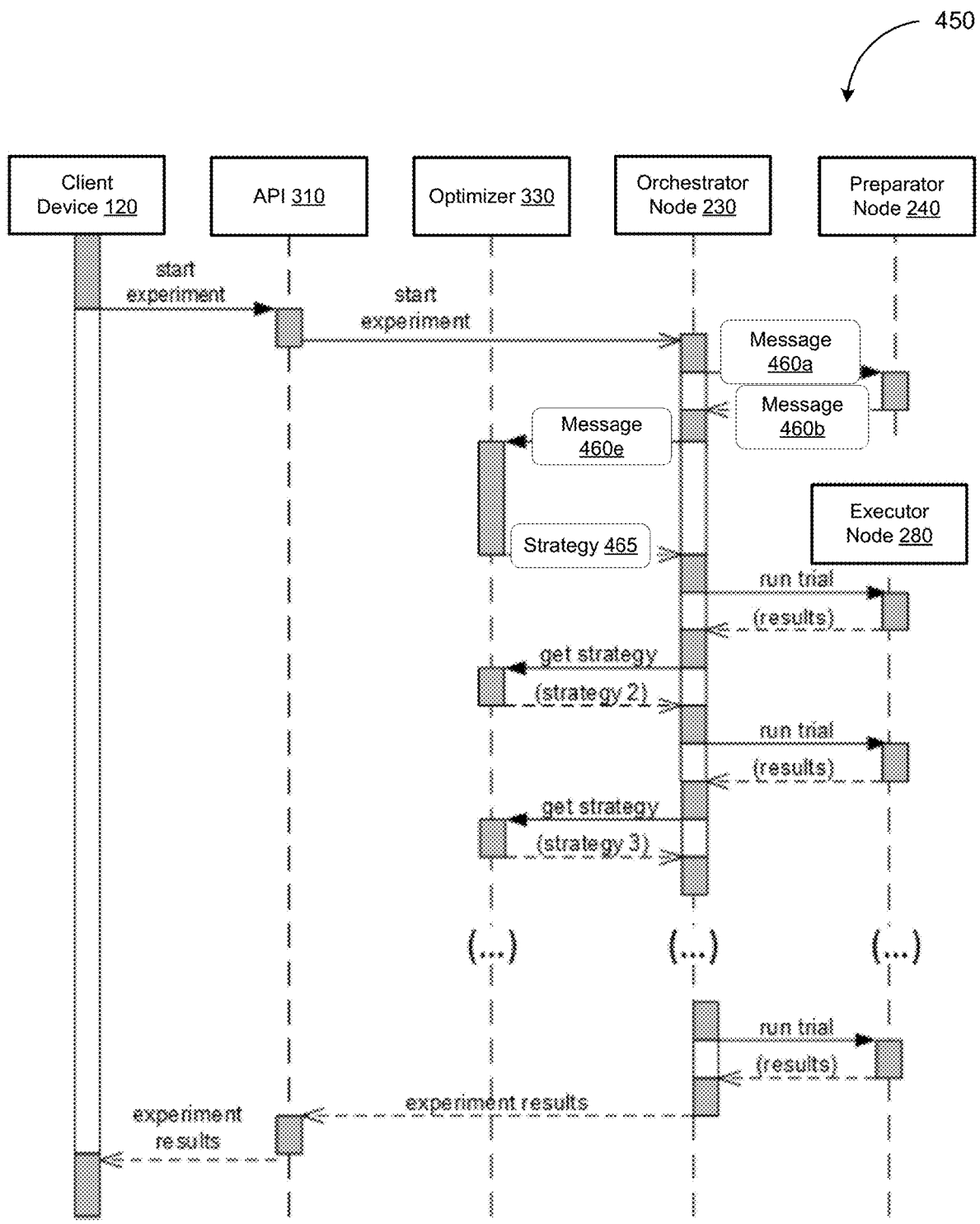
FIG. 4B depicts a sequence diagram illustrating another example of a process for generating a machine learning model trained to perform a task, in accordance with some example embodiments.

To further illustrate, FIG. 4B depicts a sequence diagram illustrating another example of a process 450 for generating a machine learning model trained to perform a task, in accordance with some example embodiments. As shown in FIG. 4B, the orchestrator node 230, for example, the orchestration engine 235, may trigger the generation of the training dataset and the validation dataset by at least sending, to the preparator node 240, the first message 460a. The preparator node 240 may respond to the first message 460a by generating the training dataset and the validation dataset as well as perform one or more preparatory tasks such as the embedding and/or encoding a variety of data (e.g., textual data, numerical data, spatial data, categorical data, and/or the like). When the preparator node 240 completes generating the training dataset and the validation dataset as well as the preparatory tasks, the preparator node 240 may send, to the orchestrator node 230, the second message 460b to notify the orchestrator node 230 of the availability of the training dataset and the validation dataset as well as the results of the preparatory tasks. As noted, the training dataset and the validation dataset may be stored in the shared persistence 115 (e.g., the experiment persistence 300) where the training dataset and the validation dataset may be accessible to the orchestrator node 230 and the executor node 280.

Upon receiving the second message 460b from the preparator node 240, the orchestrator node 230, for example, the orchestration engine 235, may send, to the optimizer 330, one or more messages requesting an optimization strategy for executing the one or more machine learning trials such as, for example, the first machine learning trial having the first set of trial parameters 470a, the second machine learning trial having the second set of trial parameters 470b, the third machine learning trial having the third set of trial parameters 470c, and/or the like. For example, as shown in FIG. 4B, the orchestration engine 235 may send, to the optimizer 330, a fifth message 460e and the optimizer 330 may respond by sending, to the orchestration engine 235, an optimization strategy 465 for executing a machine learning trial. The orchestration engine 235 may trigger, at the executor node 280, the execution of the machine learning trial, which may be executed in accordance with the corresponding set of trial parameters and optimization strategy.

Figure 7A:
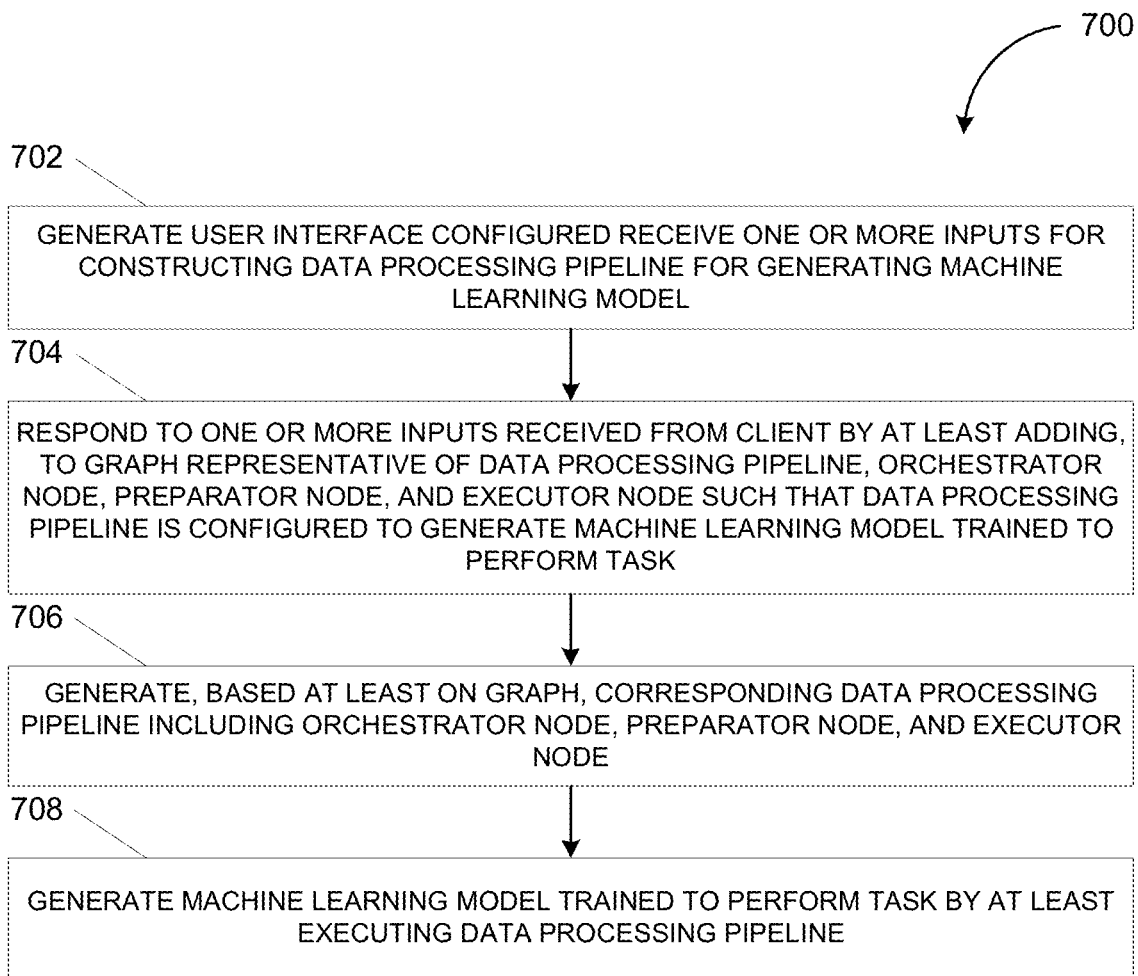
FIG. 7A depicts a flowchart illustrating a process for generating a data processing pipeline configured to generate a machine learning model, in accordance with some example embodiments.

FIG. 7A depicts a flowchart illustrating a process 700 for generating a data processing pipeline configured to generate a machine learning model, in accordance with some example embodiments. in some example embodiments, the process 700 may be performed by the pipeline controller 110 in order to generate, for example, the data processing pipeline 250 configured to generate a machine learning model. The machine learning model generated by the data processing pipeline may a machine learning model having a set of parameters and/or hyper-parameters for performing a cognitive task such as, for example, object identification, natural language processing, information retrieval, speech recognition, classification, and/or regression.

At 702, the pipeline controller 110 may generate a user interface configured to receive one or more inputs for constructing of a data processing pipeline for generating a machine learning model. For example, the pipeline controller 110 may generate the user interface 150 which may be configured to display, at the client device 120, a selection of operator nodes including, for example, the orchestrator node 230, the preparator node 240, and the executor node 280. The selection of operator nodes displayed, at the client device 120, as part of the user interface 150 may also include one or more auxiliary operator nodes including, for example, the start node 260, the user interface node 270, and/or the like. As part of a data processing pipeline, the start node 260 may be configured to receive inputs configuring a process including one or more machine learning trials while the user interface node 270 may be configured to output the progress and/or the result of the one or more machine learning trials. Alternatively, instead of displaying a selection of operator nodes, the user interface 150 may display one or more dialog boxes prompting the user 125 to select one or more operator nodes to include in a data processing pipeline.

At 704, the pipeline controller 110 may respond to one or more inputs received from the client device 120 by at least adding, to a graph representative of a data processing pipeline, the orchestrator node, the preparator node, and the executor node such that the data processing pipeline is configured to generate a machine learning model trained to perform a task. For example, the pipeline controller 110 may generate a graph representative of the data processing pipeline 250 configured to generate a machine learning model. In the example shown in FIG. 2B, the data processing pipeline 250 may be constructed to include the orchestrator node 230, the preparator node 240, and the executor node 280. Furthermore, as shown in FIG. 2B, the data processing pipeline 250 may be constructed to include the start node 260 and the user interface node 270. As noted, the data processing pipeline 250 may be executed to generate a machine learning model for performing a task associated with an input dataset. As part of the data processing pipeline 250, the start node 260 may be configured to receive inputs configuring the process to generate the machine learning model while the progress and the result of the process may be output by the user interface node 270.

The orchestrator node 230, the preparator node 240, the start node 260, the user interface node 270, and the executor node 280 may be interconnected by one or more directed edges indicating a flow of data between the orchestrator node 230, the preparator node 240, the start node 260, the user interface node 270, and the executor node 280. For instance, the orchestrator node 230 and the preparator node 240 may be interconnected by a first directed edge indicating that an output of the orchestrator node 230 may be provided as an input to the preparator node 240 as well as a second directed edge indicating that an output of the preparator node 240 may be provided as an input to the orchestrator node 230. Alternatively and/or additionally, the orchestrator node 230 and the executor node 280 may be interconnected by a third directed edge indicating that an output of the orchestrator node 230 may be provided as an input to the executor node 280 as well as a fourth directed edge indicating that an output of the executor node 280 may be provided as an input to the orchestrator node 230.

At 706, the pipeline controller 110 may generate, based at least on the graph, the corresponding data processing pipeline including the orchestrator node, the preparator node, and the executor node. For instance, in some example embodiments, the pipeline controller 110 may generate, based at least on the corresponding graph, the data processing pipeline 250 including the orchestrator node 230, the preparator node 240, the start node 260, the user interface node 270, and the executor node 280

At 708, the pipeline controller 110 may generate a machine learning model trained to perform the task by at least executing the data processing pipeline. For example, the pipeline controller 110 may generate a machine learning model trained to perform a task by at least executing the data processing pipeline 250 including the orchestrator node 230, the preparator node 240, the executor node 280, the start node 260, and the user interface node 270. Executing the data processing pipeline 250 may include performing the one or more data processing operations associated with each of the orchestrator node 230, the preparator node 240, the executor node 280, the start node 260, and the user interface node 270.

In some example embodiments, the orchestrator node 230 may be executed to at least coordinate the operations of the preparator node 240 and the executor node 280. For example, the orchestrator node 230 may respond to receiving, from the start node 260, the initial configurations for implementing the machine learning model by at least triggering, at the preparator node 240, the generation of the training dataset and the validation dataset. Upon receiving, from the preparator node 240, an indication that the preparator node 240 has generated the training dataset and the validation dataset, the orchestrator node 230 may trigger, at the executor node 280, the execution of one or more machine learning trials, each of which applying a different type of machine learning model and/or a different set of trial parameters to the training dataset and/or the validation dataset generated by the preparator node 240. Moreover, the orchestrator node 230 may be executed to at least determine, based at least on the results of the machine learning trials executed by the executor node 280, a machine learning model including the set of model parameters and hyper-parameters for performing a specified task.

Figure 7B:
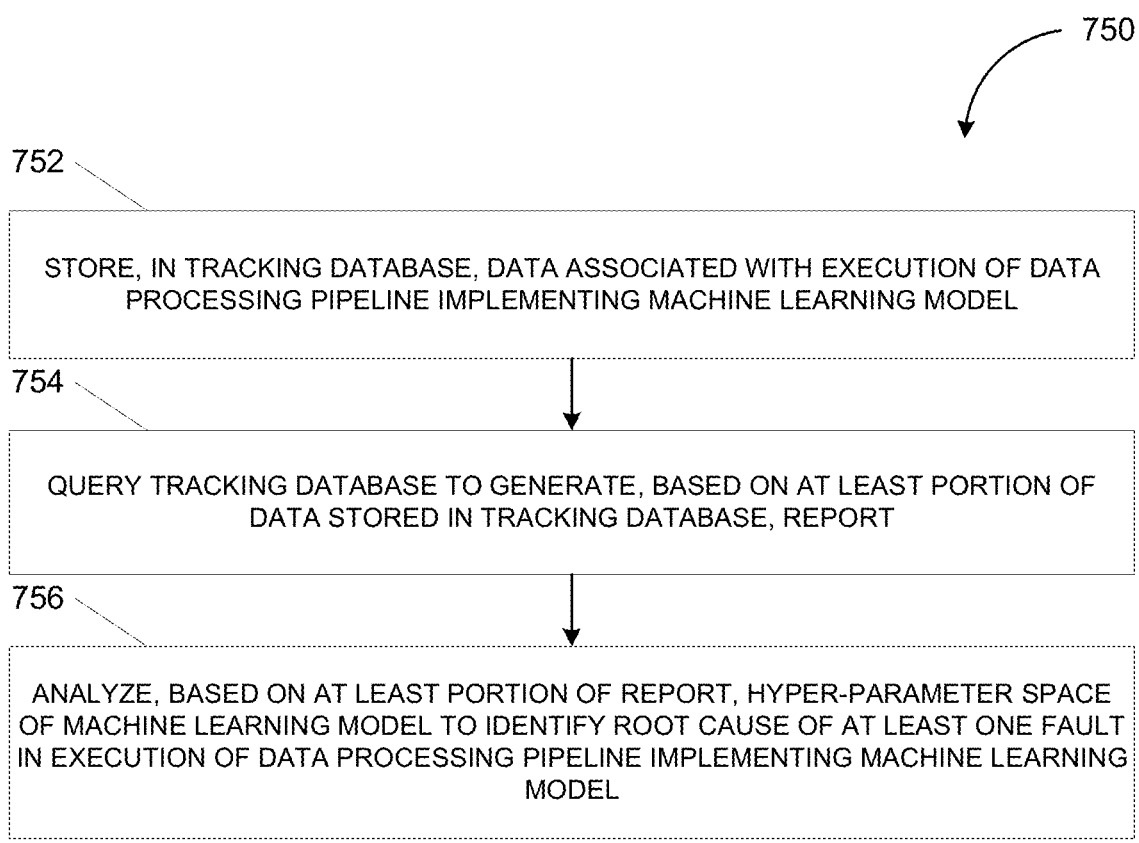
FIG. 7B depicts a flowchart illustrating an example of a process for hyper-parameter space optimization, in accordance with some example embodiments.

FIG. 7B depicts a flowchart illustrating an example of a process 750 for hyper-parameter space optimization, in accordance with some example embodiments. in some example embodiments, the process 750 may be performed by the pipeline controller 110 including, for example, the orchestrator node 230, the tracking database 315, and the report engine 325.

At 752, the pipeline controller 110 may store, in the tracking database 315, data associated with an execution of a data processing pipeline implementing a machine learning model. In some example embodiments, the orchestrator node 230 may be configured to collect, for storage in the tracking database 315, information enabling hyper-parameter space analysis and optimization. This information may include task metadata, experiment configuration, the trial configuration, and performance metrics. The orchestrator node 230 may, as noted, avoid collecting confidential information. Instead, the orchestrator node 230 may collect, from each user's dataset, non-personal identifiable information such as, for example, the quantity of rows, the quantity of categorical features, and/or the like.

At 754, the pipeline controller 110 may query the tracking database 315 to generate, based on at least a portion of the data stored in the tracking database 315, a report. In some example embodiments, the report generator 325 may generate, based on at least a portion of the data stored in the tracking database 315, a structured report. The report may be generated and provided in electronic form as a structured document (e.g., an HTML document, a PDF file, and/or the like). Moreover, the report may be generated based on a set schedule and/or in response to a trigger event including a user input requesting the generation of the report. The report may include a set of charts and a set of corresponding numeric tables providing the numeric values for the effects visualized in the charts (if available). The charts and tables may describe the importance and impact of all features, including hyper-parameters and task metadata entries, with respect to a defined target metric.

In some example embodiments, the report engine 325 may generate reports by applying an association rule algorithm to analyze the impact of categorical hyper-parameters and categorical task metadata information on binary target information, such as the flags added as part of enriching the de-normalized data. Alternatively and/or additionally, the report engine 325 may also generate the report based on explainability capabilities with an intermediary model. For example, the report engine 325 may select different subsets of the data from the tracking database 315 and train a random forest model on each subset as an intermediary model to predict the target metric for each machine learning trial in the subset. With the explainability approaches, an interpretability technique, such as Shapley Additive Explanations, may be repurposed to extract the logical connections included in the trained random forest model while disregarding the individual explanations of the intermediary model.

At 756, the pipeline controller 110 may analyze, based on at least a portion of the report, a hyper-parameter space of the machine learning model to identify a root cause of at least one fault associated with the execution of the data processing pipeline implementing the machine learning model. In some example embodiments, the contents of the report may be used to identify the root cause of one or more faults observed with the execution of the data processing pipeline (e.g., stalls, excessive resource consumption, poor results, failures, and/or the like) and perform a variety of corrective actions. Examples of corrective actions include identifying hyper-parameter values with unexpected behavior, removing certain hyper-parameters, quantizing of continuous hyper-parameter values, restricting and rescaling parameter ranges, identifying unfavorable combinations of algorithms, detecting poor scaling behavior, and identifying pipeline modules with technical issues.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system, comprising: at least one data processor; and at least one memory storing instructions, which when executed by the at least one data processor, result in operations comprising: collecting, for storage in a tracking database, data associated with an execution of a data processing pipeline, the data processing pipeline being executed to generate a machine learning model having a set of hyper-parameters for performing a task associated with an input dataset, the execution of the data processing pipeline includes executing a plurality of machine learning trials, each of the plurality of machine learning trials applying, to a training dataset, a different type of machine learning model and/or a different set of trial parameters, and the machine learning model having the set of hyper-parameters for performing the task being identified based at least on a result of the plurality of machine learning trials; generating, based on at least a portion of the data associated with the execution of the data processing pipeline, a report; analyzing, based on at least a portion of the report, a hyper-parameter space of the machine learning model; and identifying, based at least on the analysis of the hyper-parameter space, a root cause of at least one fault associated with the execution of the data processing pipeline.

Example 2: The system of example 1, further comprising: generating a logical table by at least de-normalizing the data associated with the execution of the data processing pipeline, the report being generated based on the logical table, each row of logical table corresponding to one machine learning trial from the plurality of machine learning trials, and each column of the logical table corresponding to a value describing the plurality of machine learning trials, a corresponding experiment, and/or the result of the plurality of machine learning trials.

Example 3: The system of example 2, further comprising: sorting, based at least on a target metric, the plurality of machine learning trials; and adding, to the logical table, a column corresponding to a rank of each machine learning trials included in the sorted plurality of machine learning trials.

Example 4: The system of any one of examples 2 to 3, further comprising: sorting, based at least on a target metric, the plurality of machine learning trials; and adding, to the logical table, a column corresponding to a rank of each machine learning trials included in the sorted plurality of machine learning trials.

Example 5: The system of any one of examples 1 to 4, wherein the report is generated by applying an association rules algorithm to generate one or more association rules linking one or more hyper-parameters of the machine learning model to the result of the plurality of machine learning trials.

Example 6: The system of example 5, wherein an association rule supported by a below-threshold proportion of the data associated with the execution of the data processing pipeline is excluded from the one or more association rules applied to generate the report.

Example 7: The system of any one of examples 1 to 6, wherein the report is generated by applying an interpretability technique to calculate an effect of a hyper-parameter of the machine learning model on a target metric.

Example 8: The system of any one of examples 1 to 7, wherein the at least one fault includes one or more hyper-parameter values with an unexpected behavior, a combination of machine learning models with below-threshold performance, and/or poor scaling behavior.

Example 9: The system of any one of examples 1 to 8, further comprising: performing one or more corrective actions corresponding to the root cause of the at least one fault, the one or more corrective actions include removing a hyper-parameter, quantizing a hyper-parameter having continuous values, and/or restricting and/or rescaling a range of a hyper-parameter.

Example 10: The system of any one of examples 1 to 9, wherein the data associated with the execution of the data processing pipeline includes one or more task metadata, target performance metrics, and hyper-parameter values.

Example 11: The system of any one of examples 1 to 10, wherein the data processing pipeline includes an orchestrator node, a preparator node, and a plurality of executor nodes, wherein the preparator node is configured to generate, based at least on the input dataset, the training dataset, wherein the plurality of executor nodes are configured to execute the plurality of machine learning trials by at least applying, to the training dataset, the different type of machine learning model and/or the different set of trial parameters, and wherein the orchestrator node is configured to identify, based at least on the result of the plurality of machine learning trials, the machine learning model having the set of hyper-parameters for performing the task.

Example 12: The system of any one of examples 1 to 11, wherein the machine learning model comprises a neural network, a regression model, an instance-based model, a regularization model, a decision tree, a random forest, a Bayesian model, a clustering model, an associative model, a dimensionality reduction model, and/or an ensemble model.

Example 13: A method, comprising: collecting, for storage in a tracking database, data associated with an execution of a data processing pipeline, the data processing pipeline being executed to generate a machine learning model having a set of hyper-parameters for performing a task associated with an input dataset, the execution of the data processing pipeline includes executing a plurality of machine learning trials, each of the plurality of machine learning trials applying, to a training dataset, a different type of machine learning model and/or a different set of trial parameters, and the machine learning model having the set of hyper-parameters for performing the task being identified based at least on a result of the plurality of machine learning trials; generating, based on at least a portion of the data associated with the execution of the data processing pipeline, a report; analyzing, based on at least a portion of the report, a hyper-parameter space of the machine learning model; and identifying, based at least on the analysis of the hyper-parameter space, a root cause of at least one fault associated with the execution of the data processing pipeline.

Example 14: The method example 13, further comprising: generating a logical table by at least de-normalizing the data associated with the execution of the data processing pipeline, the report being generated based on the logical table, each row of logical table corresponding to one machine learning trial from the plurality of machine learning trials, and each column of the logical table corresponding to a value describing the plurality of machine learning trials, a corresponding experiment, and/or the result of the plurality of machine learning trials.

Example 15: The method of example 14, further comprising: sorting, based at least on a target metric, the plurality of machine learning trials; and adding, to the logical table, a column corresponding to a rank of each machine learning trials included in the sorted plurality of machine learning trials.

Example 16: The method of any one of examples 14-15, further comprising: determining, for each machine learning trial of the plurality of machine learning trials, a relative deviation from a target metric associated with a validation dataset and/or a test dataset; and adding, to the logical table, a column corresponding to the relative deviation.

Example 17: The method of any one of examples 13-16, wherein the report is generated by applying an association rules algorithm to generate one or more association rules linking one or more hyper-parameters of the machine learning model to the result of the plurality of machine learning trials, and wherein an association rule supported by a below-threshold proportion of the data associated with the execution of the data processing pipeline is excluded from the one or more association rules applied to generate the report.

Example 18: The method of any one of examples 13 to 17, wherein the report is generated by applying an interpretability technique to calculate an effect of a hyper-parameter of the machine learning model on a target metric.

Example 19: The method of any one of examples 13 to 18, further comprising: performing one or more corrective actions corresponding to the root cause of the at least one fault, the one or more corrective actions include removing a hyper-parameter, quantizing a hyper-parameter having continuous values, and/or restricting and/or rescaling a range of a hyper-parameter.

Example 20: A non-transitory computer readable medium storing instructions, which when executed by at least one data processor, result in operations comprising: collecting, for storage in a tracking database, data associated with an execution of a data processing pipeline, the data processing pipeline being executed to generate a machine learning model having a set of hyper-parameters for performing a task associated with an input dataset, the execution of the data processing pipeline includes executing a plurality of machine learning trials, each of the plurality of machine learning trials applying, to a training dataset, a different type of machine learning model and/or a different set of trial parameters, and the machine learning model having the set of hyper-parameters for performing the task being identified based at least on a result of the plurality of machine learning trials; generating, based on at least a portion of the data associated with the execution of the data processing pipeline, a report; analyzing, based on at least a portion of the report, a hyper-parameter space of the machine learning model; and identifying, based at least on the analysis of the hyper-parameter space, a root cause of at least one fault associated with the execution of the data processing pipeline.

Figure 8:
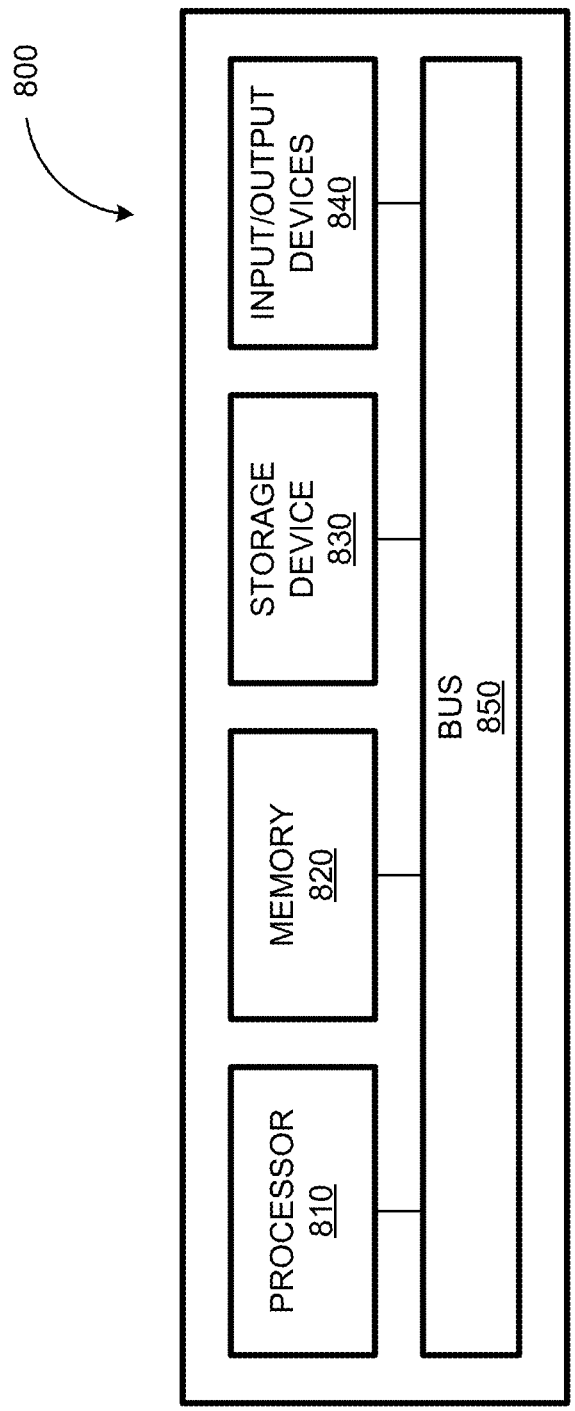
FIG. 8 depicts a block diagram illustrating a computing system, in accordance with some example embodiments.

FIG. 8 depicts a block diagram illustrating a computing system 800 consistent with implementations of the current subject matter. Referring to FIGS. 1-8, the computing system 800 can be used to implement the pipeline controller 110 and/or any components therein.

As shown in FIG. 8, the computing system 800 can include a processor 810, a memory 820, a storage device 830, and input/output devices 840. The processor 810, the memory 820, the storage device 830, and the input/output devices 840 can be interconnected via a system bus 850. The processor 810 is capable of processing instructions for execution within the computing system 800. Such executed instructions can implement one or more components of, for example, the pipeline controller 110. In some example embodiments, the processor 810 can be a single-threaded processor. Alternately, the processor 810 can be a multi-threaded processor. The processor 810 is capable of processing instructions stored in the memory 820 and/or on the storage device 830 to display graphical information for a user interface provided via the input/output device 840.

The memory 820 is a computer readable medium such as volatile or non-volatile that stores information within the computing system 800. The memory 820 can store data structures representing configuration object databases, for example. The storage device 830 is capable of providing persistent storage for the computing system 800. The storage device 830 can be a solid state drive, a floppy disk device, a hard disk device, an optical disk device, or a tape device, or other suitable persistent storage means. The input/output device 840 provides input/output operations for the computing system 800. In some example embodiments, the input/output device 840 includes a keyboard and/or pointing device. In various implementations, the input/output device 840 includes a display unit for displaying graphical user interfaces.

According to some example embodiments, the input/output device 840 can provide input/output operations for a network device. For example, the input/output device 840 can include Ethernet ports or other networking ports to communicate with one or more wired and/or wireless networks (e.g., a local area network (LAN), a wide area network (WAN), the Internet).

In some example embodiments, the computing system 800 can be used to execute various interactive computer software applications that can be used for organization, analysis and/or storage of data in various formats. Alternatively, the computing system 800 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 840. The user interface can be generated and presented to a user by the computing system 800 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include client devices and servers. A client device and server are generally remote from each other and typically interact through a communication network. The relationship of client device and server arises by virtue of computer programs running on the respective computers and having a client device-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random query memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, result in operations comprising:
   collecting, for storage in a tracking database, data associated with an execution of a data processing pipeline, the data processing pipeline being executed to generate a machine learning model having a set of hyper-parameters for performing a task associated with an input dataset, the execution of the data processing pipeline includes executing a plurality of machine learning trials, each of the plurality of machine learning trials applying, to a training dataset, a different type of machine learning model and/or a different set of trial parameters, and the machine learning model having the set of hyper-parameters for performing the task being identified based at least on a result of the plurality of machine learning trials;

generating, based on at least a portion of the data associated with the execution of the data processing pipeline, a report;

analyzing, based on at least a portion of the report, a hyper-parameter space of the machine learning model; and identifying, based at least on the analysis of the hyper-parameter space, a root cause of at least one fault associated with the execution of the data processing pipeline.

2. The system of claim 1, further comprising:

generating a logical table by at least de-normalizing the data associated with the execution of the data processing pipeline, the report being generated based on the logical table, each row of logical table corresponding to one machine learning trial from the plurality of machine learning trials, and each column of the logical table corresponding to a value describing the plurality of machine learning trials, a corresponding experiment, and/or the result of the plurality of machine learning trials.

3. The system of claim 2, further comprising:

sorting, based at least on a target metric, the plurality of machine learning trials; and adding, to the logical table, a column corresponding to a rank of each machine learning trials included in the sorted plurality of machine learning trials.

4. The system of claim 2, further comprising:

determining, for each machine learning trial of the plurality of machine learning trials, a relative deviation from a target metric associated with a validation dataset and/or a test dataset; and adding, to the logical table, a column corresponding to the relative deviation.

5. The system of claim 1, wherein the report is generated by applying an association rules algorithm to generate one or more association rules linking one or more hyper-parameters of the machine learning model to the result of the plurality of machine learning trials.

6. The system of claim 5, wherein an association rule supported by a below-threshold proportion of the data associated with the execution of the data processing pipeline is excluded from the one or more association rules applied to generate the report.

7. The system of claim 1, wherein the report is generated by applying an interpretability technique to calculate an effect of a hyper-parameter of the machine learning model on a target metric.

8. The system of claim 1, wherein the at least one fault includes one or more hyper-parameter values with an unexpected behavior, a combination of machine learning models with below-threshold performance, and/or poor scaling behavior.

9. The system of claim 1, further comprising:

performing one or more corrective actions corresponding to the root cause of the at least one fault, the one or more corrective actions include removing a hyper-parameter, quantizing a hyper-parameter having continuous values, and/or restricting and/or rescaling a range of a hyper-parameter.

10. The system of claim 1, wherein the data associated with the execution of the data processing pipeline includes one or more task metadata, target performance metrics, and hyper-parameter values.

11. The system of claim 1, wherein the data processing pipeline includes an orchestrator node, a preparator node, and a plurality of executor nodes, wherein the preparator node is configured to generate, based at least on the input dataset, the training dataset, wherein the plurality of executor nodes are configured to execute the plurality of machine learning trials by at least applying, to the training dataset, the different type of machine learning model and/or the different set of trial parameters, and wherein the orchestrator node is configured to identify, based at least on the result of the plurality of machine learning trials, the machine learning model having the set of hyper-parameters for performing the task.

12. The system of claim 1, wherein the machine learning model comprises a neural network, a regression model, an instance-based model, a regularization model, a decision tree, a random forest, a Bayesian model, a clustering model, an associative model, a dimensionality reduction model, and/or an ensemble model.

13. A computer-implemented method, comprising:

collecting, for storage in a tracking database, data associated with an execution of a data processing pipeline, the data processing pipeline being executed to generate a machine learning model having a set of hyper-parameters for performing a task associated with an input dataset, the execution of the data processing pipeline includes executing a plurality of machine learning trials, each of the plurality of machine learning trials applying, to a training dataset, a different type of machine learning model and/or a different set of trial parameters, and the machine learning model having the set of hyper-parameters for performing the task being identified based at least on a result of the plurality of machine learning trials;

generating, based on at least a portion of the data associated with the execution of the data processing pipeline, a report;

analyzing, based on at least a portion of the report, a hyper-parameter space of the machine learning model; and identifying, based at least on the analysis of the hyper-parameter space, a root cause of at least one fault associated with the execution of the data processing pipeline.

14. The method of claim 13, further comprising:

generating a logical table by at least de-normalizing the data associated with the execution of the data processing pipeline, the report being generated based on the logical table, each row of logical table corresponding to one machine learning trial from the plurality of machine learning trials, and each column of the logical table corresponding to a value describing the plurality of machine learning trials, a corresponding experiment, and/or the result of the plurality of machine learning trials.

15. The method of claim 14, further comprising:

sorting, based at least on a target metric, the plurality of machine learning trials; and adding, to the logical table, a column corresponding to a rank of each machine learning trials included in the sorted plurality of machine learning trials.

16. The method of claim 14, further comprising:

determining, for each machine learning trial of the plurality of machine learning trials, a relative deviation from a target metric associated with a validation dataset and/or a test dataset; and adding, to the logical table, a column corresponding to the relative deviation.

17. The method of claim 13, wherein the report is generated by applying an association rules algorithm to generate one or more association rules linking one or more hyper-parameters of the machine learning model to the result of the plurality of machine learning trials, and wherein an association rule supported by a below-threshold proportion of the data associated with the execution of the data processing pipeline is excluded from the one or more association rules applied to generate the report.

18. The method of claim 13, wherein the report is generated by applying an interpretability technique to calculate an effect of a hyper-parameter of the machine learning model on a target metric.

19. The method of claim 1, further comprising:
performing one or more corrective actions corresponding to the root cause of the at least one fault, the one or more corrective actions include removing a hyper-parameter, quantizing a hyper-parameter having continuous values, and/or restricting and/or rescaling a range of a hyper-parameter.

20. A non-transitory computer readable medium storing instructions, which when executed by at least one data processor, result in operations comprising:
collecting, for storage in a tracking database, data associated with an execution of a data processing pipeline, the data processing pipeline being executed to generate a machine learning model having a set of hyper-parameters for performing a task associated with an input dataset, the execution of the data processing pipeline includes executing a plurality of machine learning trials, each of the plurality of machine learning trials applying, to a training dataset, a different type of machine learning model and/or a different set of trial parameters, and the machine learning model having the set of hyper-parameters for performing the task being identified based at least on a result of the plurality of machine learning trials;
generating, based on at least a portion of the data associated with the execution of the data processing pipeline, a report;
analyzing, based on at least a portion of the report, a hyper-parameter space of the machine learning model; and
identifying, based at least on the analysis of the hyper-parameter space, a root cause of at least one fault associated with the execution of the data processing pipeline.

* * * * *